US011560781B2

(12) United States Patent
Dutta et al.

(10) Patent No.: US 11,560,781 B2
(45) Date of Patent: Jan. 24, 2023

(54) METHOD AND APPARATUS FOR MULTI-BARRIER TRANSIENT ELECTROMAGNETIC (TEM) MEASUREMENTS

(71) Applicant: Baker Hughes Oilfield Operations LLC, Houston, TX (US)

(72) Inventors: Sushant Dutta, Houston, TX (US); Joseph Olaiya, Houston, TX (US); Otto Fanini, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 169 days.

(21) Appl. No.: 16/906,100

(22) Filed: Jun. 19, 2020

(65) Prior Publication Data

US 2020/0400008 A1 Dec. 24, 2020

Related U.S. Application Data

(60) Provisional application No. 62/864,923, filed on Jun. 21, 2019.

(51) Int. Cl.
*G01V 3/30* (2006.01)
*E21B 47/00* (2012.01)
*E21B 47/005* (2012.01)
*E21B 47/12* (2012.01)

(52) U.S. Cl.
CPC .......... *E21B 47/006* (2020.05); *E21B 47/005* (2020.05); *G01V 3/30* (2013.01); *E21B 47/12* (2013.01)

(58) Field of Classification Search
None
See application file for complete search history.

(56) References Cited

U.S. PATENT DOCUMENTS

| 2004/0100256 | A1* | 5/2004 | Fickert ............... G01N 27/902 324/238 |
| 2004/0256101 | A1 | 12/2004 | Fox |
| 2006/0015257 | A1 | 1/2006 | Hassan |

(Continued)

FOREIGN PATENT DOCUMENTS

| EP | 2950038 B1 * | 2/2017 | ............ E21B 41/02 |
| WO | WO-2014035285 A1 * | 3/2014 | ............ E21B 47/00 |

OTHER PUBLICATIONS

International Search Report and Written Opinion dated Nov. 4, 2020 in corresponding PCT Application No. PCT/US20/38929.

(Continued)

*Primary Examiner* — Curtis A Kuntz
*Assistant Examiner* — Jerold B Murphy
(74) *Attorney, Agent, or Firm* — Hogan Lovells US LLP

(57) ABSTRACT

A computer-implemented method includes receiving a plurality of sensor signals, each signal of the plurality of sensor signals being tagged with an associated time and depth. The method also includes selecting a baseline signal. The method further includes comparing a selected sensor signal, of the plurality of sensor signals, to the baseline signal. The method also includes determining a difference between the baseline signal and the selected sensor signal exceeds a threshold. The method includes identifying, based at least in part on the difference, a feature of interest associated with the selected sensor signal.

16 Claims, 21 Drawing Sheets

(56) References Cited

U.S. PATENT DOCUMENTS

| | | |
|---|---|---|
| 2012/0123757 A1 | 5/2012 | Ertas |
| 2013/0049982 A1 | 2/2013 | Hailmann |
| 2015/0006115 A1 | 1/2015 | Svoboda |
| 2017/0261469 A1* | 9/2017 | Chang .................... G01V 3/28 |
| 2019/0162870 A1* | 5/2019 | San Martin ............ E21B 47/00 |
| 2020/0182830 A1* | 6/2020 | Fouda ................ G01N 27/9046 |

OTHER PUBLICATIONS

Le-Huy et al., "Real-Time Multi-Rate Electromagnetic Transient Simulation on Conventional CPUs," Jun. 20, 2019, Retrieved on Oct. 8, 2020 from https://www.ipstconf.org/Proc_IPST2019/19IPST077.pdf, entire document.

* cited by examiner

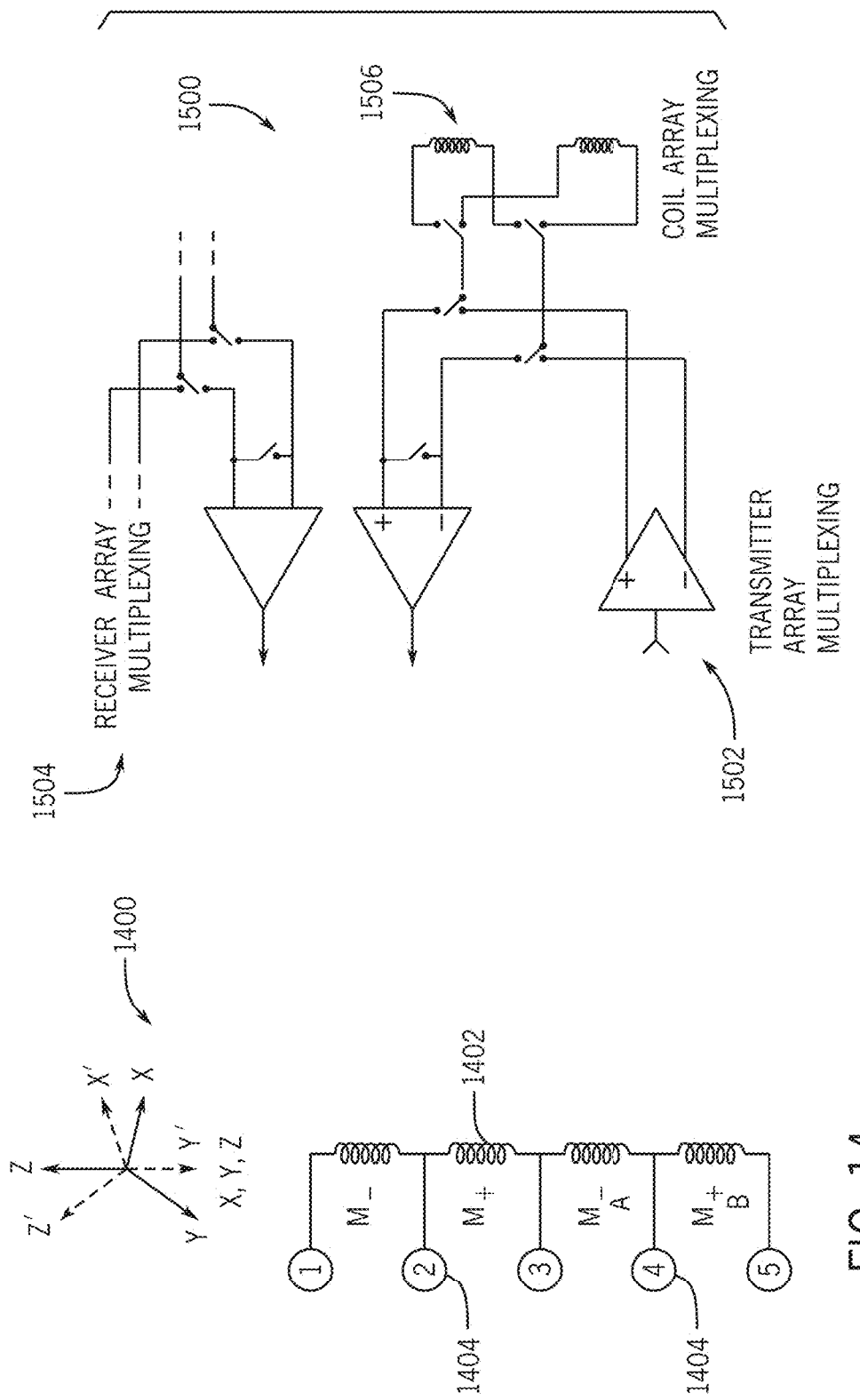

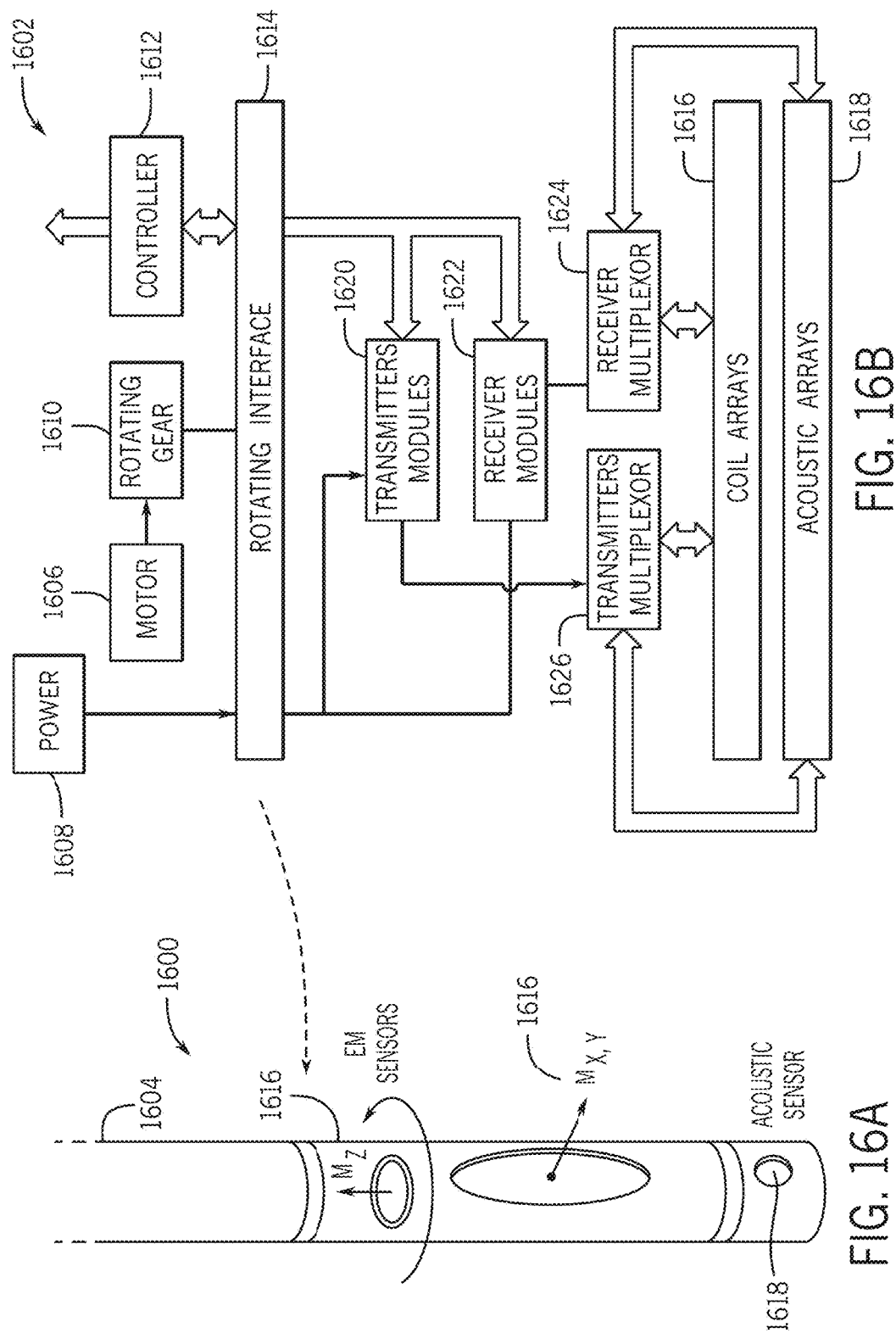

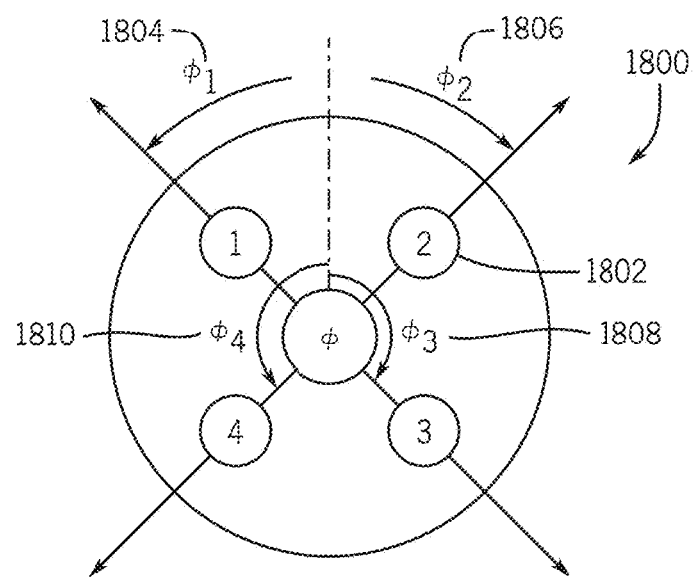
FIG. 18
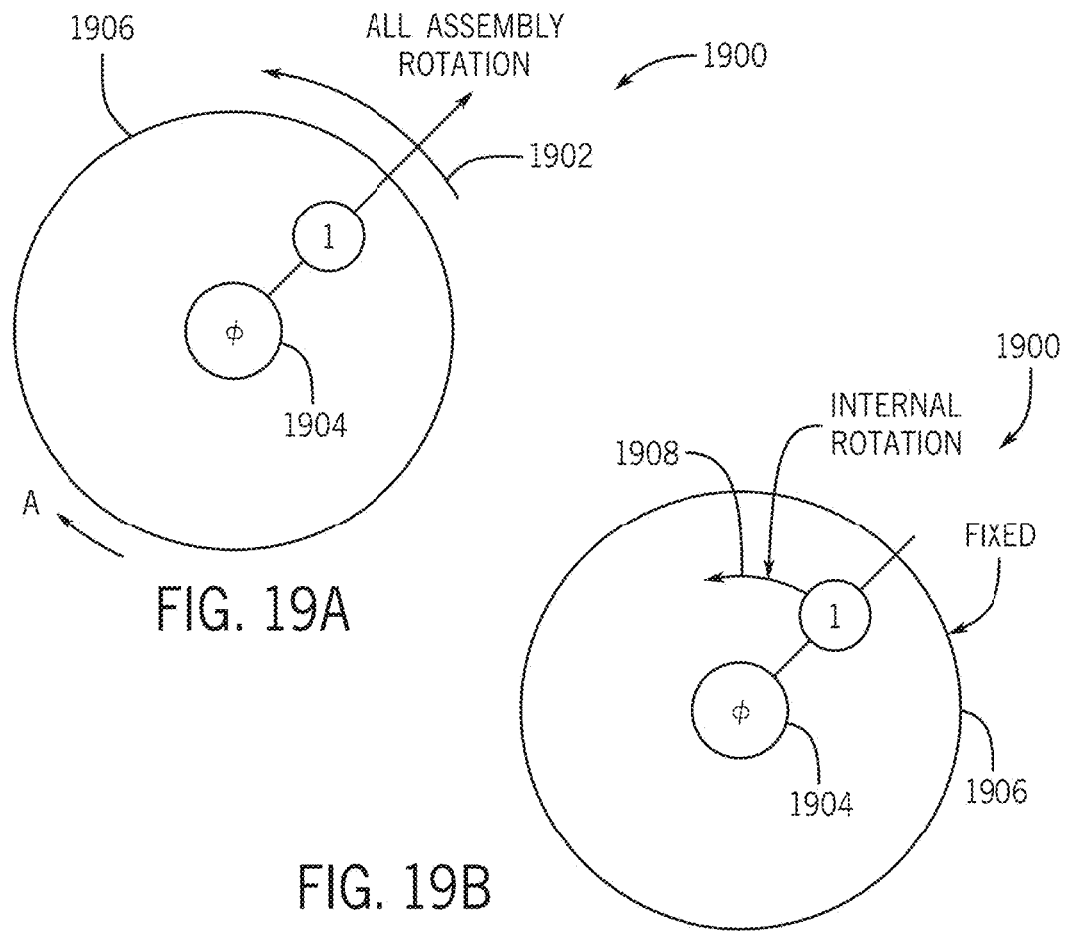
FIG. 19A
FIG. 19B

METHOD AND APPARATUS FOR MULTI-BARRIER TRANSIENT ELECTROMAGNETIC (TEM) MEASUREMENTS

CROSS REFERENCE TO RELATED APPLICATIONS

This application claims priority to and the benefit of U.S. Provisional Application Ser. No. 62/864,923 filed Jun. 21, 2019 titled "METHOD AND APPARATUS FOR MULTI-BARRIER TRANSIENT ELECTROMAGNETIC (TEM) MEASUREMENTS," the full disclosure of which is hereby incorporated herein by reference in its entirety for all purposes.

BACKGROUND

1. Field of Invention

This disclosure relates in general to oil and gas tools, and in particular, to systems and methods for downhole measurements that may be utilized to determine metal loss or metal gain along portions of a wellbore.

2. Description of the Prior Art

In oil and gas production, it may be desirable to evaluate a wellbore and associated downhole tubulars for metal loss or metal gain. A determination of metal loss may be indicative of damage or corrosion, which may lead to an operator performing mitigating tasks or the like. However, various techniques may only describe total metal loss or total metal gain for an individual barrier of the downhole tubulars. This may be insufficient for wellbores that include multiple barriers.

SUMMARY

Applicant recognized the limitations with existing systems herein and conceived and developed embodiments of systems and methods, according to the present disclosure, for improved downhole material evaluation.

In an embodiment, a computer-implemented method includes receiving a plurality of sensor signals, each signal of the plurality of sensor signals being tagged with an associated time and depth. The method also includes selecting a baseline signal. The method further includes comparing a selected sensor signal, of the plurality of sensor signals, to the baseline signal. The method also includes determining a difference between the baseline signal and the selected sensor signal exceeds a threshold. The method includes identifying, based at least in part on the difference, a feature of interest associated with the selected sensor signal.

In an embodiment, a system for identifying a feature of interest in a wellbore includes a tool string and a rotating tool section. The rotating tool section is coupled to the tool string, at an interface, and includes a coil array, the coil array adapted to transmit electromagnetic signals into a formation, a transmitter module, and a receiver module. At least one of a shell of the rotating tool section or the coil array is rotatable about an axis of the tool string to provide an azimuthal resolution of the wellbore.

In an embodiment, a method for identifying a feature of interest includes receiving a well log for at least a portion of a wellbore. The method also includes comparing a signal, the signal corresponding to a depth and a time, against a reference value. The method further includes determining a difference between the signal and the reference value exceeds a threshold. The method also includes identifying the feature of interest.

BRIEF DESCRIPTION OF THE DRAWINGS

The present technology will be better understood on reading the following detailed description of non-limiting embodiments thereof, and on examining the accompanying drawings, in which:

FIG. 14 is a schematic diagram of an embodiment of a transient electromagnetic tool, in accordance with embodiments of the present disclosure;

FIG. 15 is a schematic diagram of an embodiment of receiver and transmitter multiplexing, in accordance with embodiments of the present disclosure;

FIG. 16A is a perspective view of an embodiment of a rotating tool section, in accordance with embodiments of the present disclosure;

FIG. 16B is a schematic diagram of an embodiment of a rotating tool section, in accordance with embodiments of the present disclosure;

FIG. 18 is a schematic top view of an embodiment of an azimuthal sensor array, in accordance with embodiments of the present disclosure;

FIGS. 19A and 19B are schematic top views of embodiments of a rotating tool section, in accordance with embodiments of the present disclosure;

DETAILED DESCRIPTION OF THE INVENTION

Figure 1:
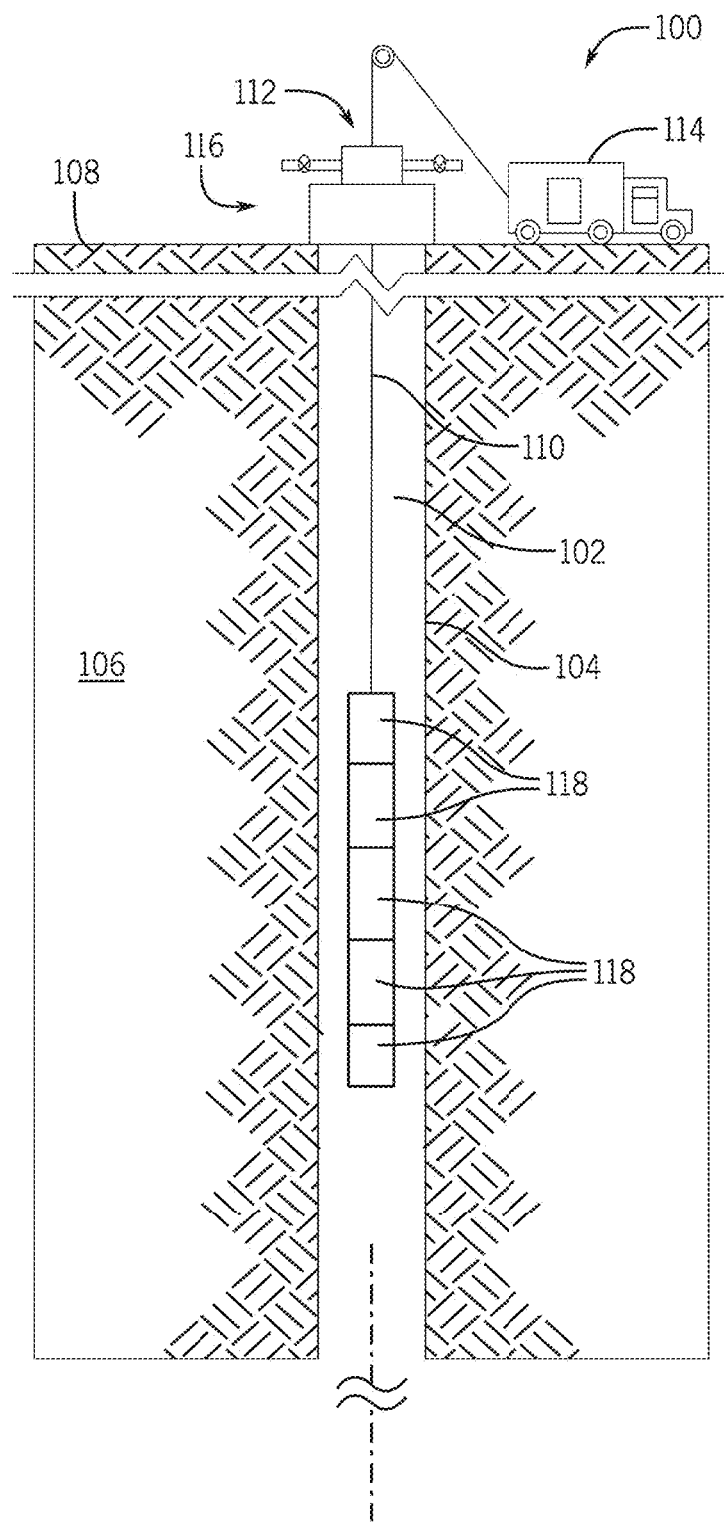
FIG. 1 is a cross-sectional side view of an embodiment of an wellbore system, in accordance with embodiments of the present disclosure.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure are directed to downhole tools, such as wireline tools and logging-while-drilling (LWD) tools, that use transient electromagnetic (TEM) measurements to investigate multiple tubing and casing strings (generically called barriers). State of the art tools in this class are able to measure metal loss and metal gain features in up to 5 barriers. Although these measurements isolate the metal loss or metal gain feature to each individual barrier, they are not able to indicate whether the feature is on the inner surface of the barrier or the outer surface. Embodiments of the present disclosure are directed toward a system and method to locate the individual surface of the barrier where the metal loss or metal gain feature occurs.

FIG. 1 is a schematic cross-sectional view of an embodiment of a wellbore system 100 including a downhole tool 102 arranged within a wellbore 104 formed in a formation 106. The downhole tool 102 is lowered from a surface location 108 via a conveyance system, such as the illustrated wireline 110. In various embodiments, the electric wireline may transmit electric signals and/or energy from the surface location 108 into the wellbore, for example to provide operational power for the tool 102 and/or to transmit data, such as data obtained from sensors arranged on the tool 102. In various embodiments, the tool 102 may be utilized to perform downhole logging operations, such as an imaging tool, a resistivity tool, a nuclear tool, or any other logging tool that may be used in a downhole environment. It should be appreciated that embodiments exist where the downhole tool 102 is deployed with any other type of conveyance means, including coiled tubing, pipes, cable, and slickline. That is, embodiments of the present disclosure may be utilized in other scenarios, such as measurement while drilling, production logging, and the like.

The wellbore system 100 includes a wellhead assembly 112, shown at an opening of the wellbore 104, to provide pressure control of the wellbore 104 and allow for passage of equipment into the wellbore 104, such as the cable 110 and the tool 102. In this example, the cable 110 is a wireline being spooled from a service truck 114. The wellhead assembly 112 may include a blowout preventer (BOP) 116 (e.g., pressure control device).

In various embodiments, the downhole tool 102 includes a number of segments 118, which may represent different devices or sensors utilized to obtain information from the downhole environment. By way of example only, one segment may be related to dielectric services that include one or more antennas (or antenna transmitter and receiver pairs) in order to generate transmit signals in radio frequencies and to detect signals. Another segment may include one or more electromagnetic tools, which may include both transmitters and receivers. As will be described herein, the tools may be positioned to transmit a signal (such as an electromagnetic signal) into the formation and receive information back, which may then be processed in order to identify one or more properties of the wellbore and/or wellbore components.

In various embodiments, a generic TEM system may include a single coil winding that is deployed inside the tubing of a multi-barrier system, such as a cased wellbore or the like. Multi-barrier may refer to a system where multiple tubulars are arranged radially outward from one another such that an outer diameter of a first tubular is less than an inner diameter of a second tubular and so forth. The tubulars may be coaxial. In various embodiments, the coil carries a constant electric current which is abruptly switched off at time t=0 seconds. Starting at time t=0+seconds, a voltage across the coil, in open circuit mode, is measured. The abrupt switching off of the electric current in the coil triggers an electromagnetic diffusion process in the barriers around the coil. Eddy currents are induced in the barriers and these currents diffuse outwards from the coil with time.

Figure 2:
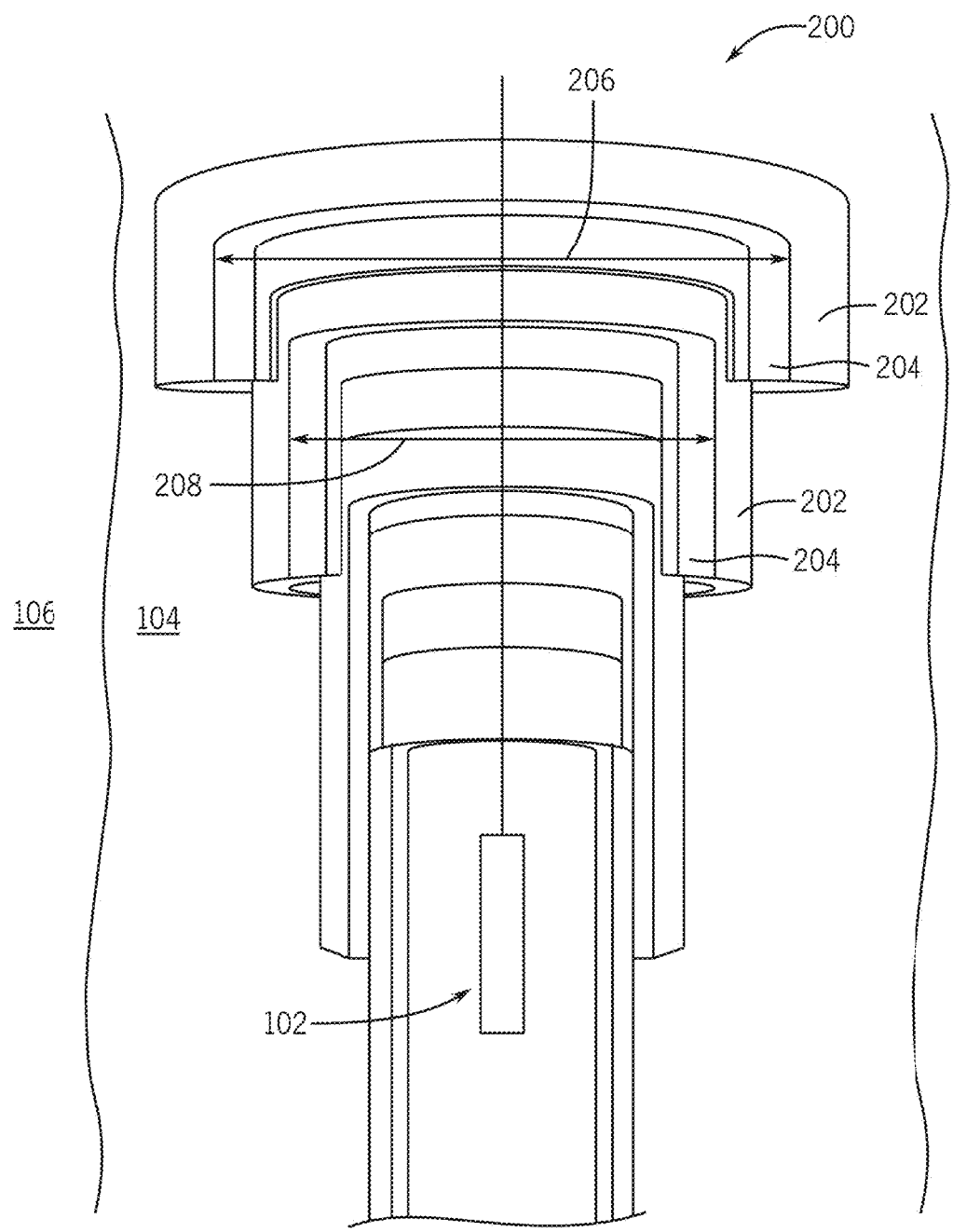
FIG. 2 is a cross-sectional side view of an embodiment of a multi-barrier wellbore system, in accordance with embodiments of the present disclosure.
Figure 3B:
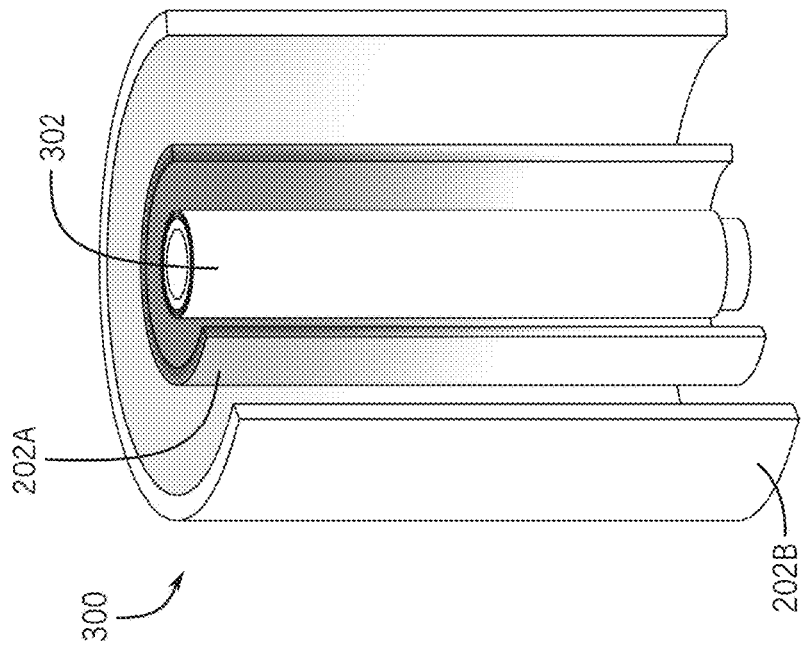
FIGS. 3A-3F are cross-sectional views of embodiments of current densities in a two-barrier wellbore, in accordance with embodiments of the present disclosure.
Figure 3A:
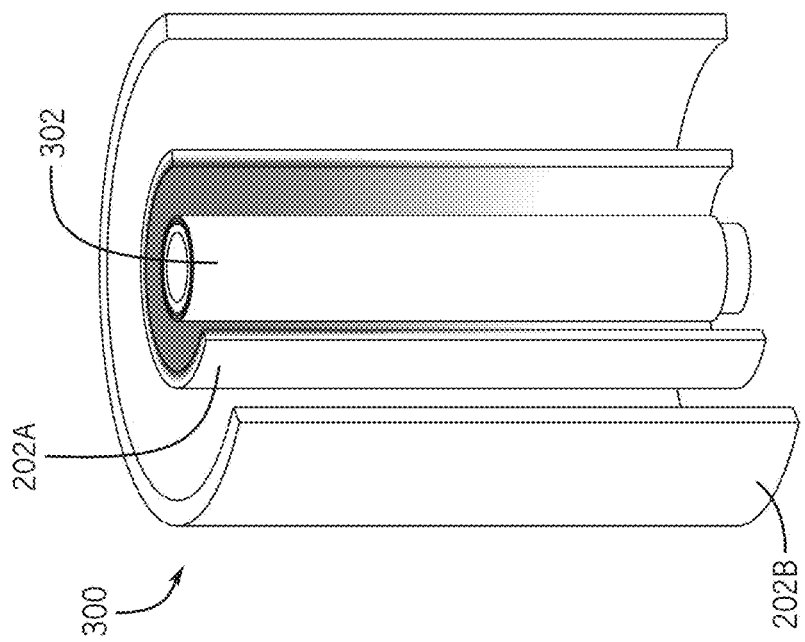
Figure 3C:
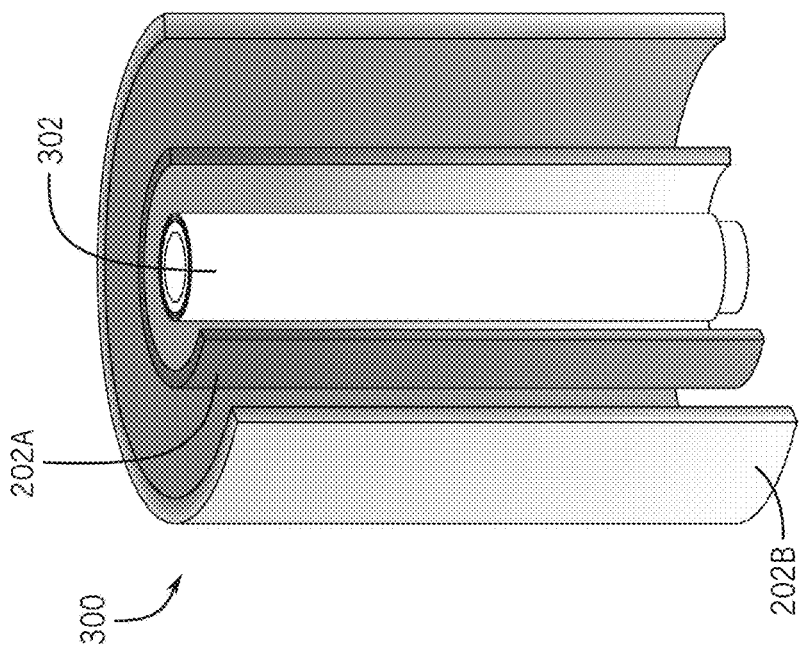
Figure 3D:
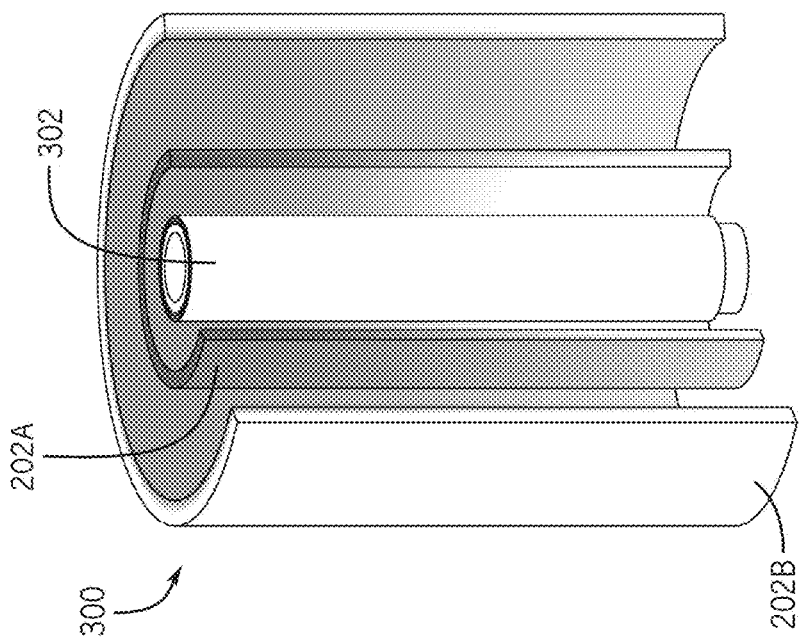
Figure 3F:
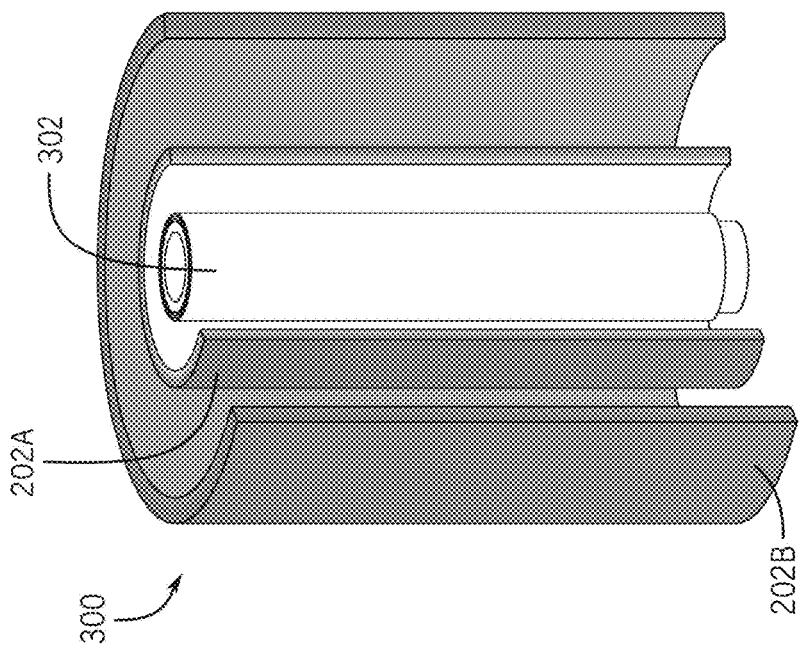
Figure 3E:
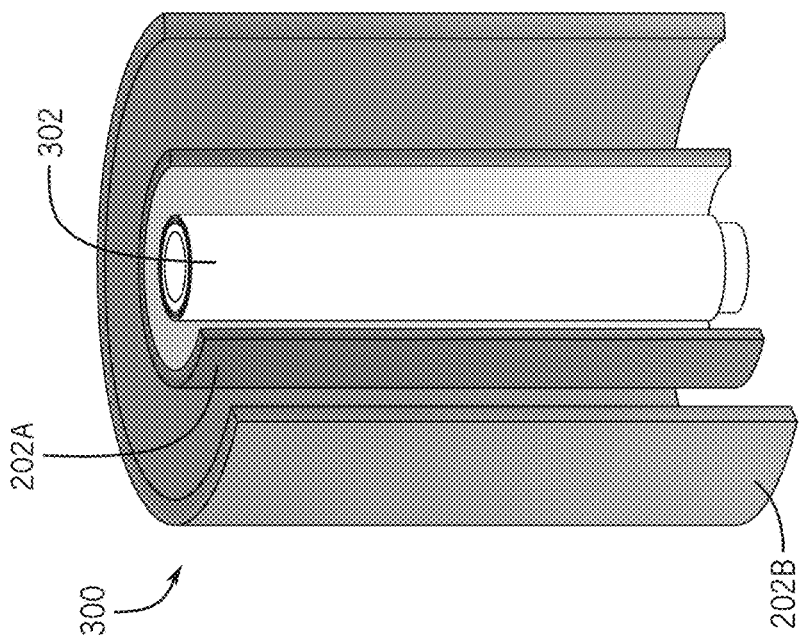

FIG. 2 is a schematic cross-sectional view of an embodiment of a multi-barrier system 200. As noted above, the system 200 includes a series of tubular casings 202, which may be metallic, and cement walls 204 between the casings 202. Often, when drilling hydrocarbon wells, a first wellbore diameter 206 is larger than a second wellbore diameter 208. In other words, as the wellbore 104 gets deeper, the diameter decreases. In various embodiments, the wellbore 104 may be cased, as in, lined by the tubular casings 202 and held into place against the formation 106 and/or other casing sections via cement forming the cement walls 204. It may be desirable to inspect the integrity of the casing 202 and/or the cement walls 204, for example for potential abnormalities or defects such as mud channel defects, bonding defects, air voids, defects in the casing, loss of material, eccentricity of the well.

FIGS. 3A-3F are schematic cross-sectional views of a measurement circumstance 300 where at least one segment, which may be an electromagnetic system 302, is arranged proximate a multi-barrier section of the wellbore 104. As shown by the gradient represented in the figures, an induced current density is provided responsive to operation of the electromagnetic system 302. The illustrated embodiment utilizes a two barrier system, represented by the tubulars 202A, 202B, but it should be appreciated that there may be any reasonable number of tubulars 202, with two being shown here for illustrative purposes and convenience.

The illustrated embodiments as shown over a period of time, for example over a period of approximately 100 ms. For example, FIG. 3A may correspond to a response at 0.1 ms, FIG. 3B may be at approximately 20 ms, FIG. 3C may be at approximately 40 ms, FIG. 3D may be at approximately 60 ms, FIG. 3E may be at approximately 80 ms, and FIG. 3F may be at approximately 100 ms. As illustrated, a current density increases closer to the electromagnetic system 302, is transmitted through the tubulars 202A, 202B, and then fades, for example, where the electromagnetic system 302 is turned on and off. In other words, a maximum current density is localized on the inner wall 304 of the tubular 202A at early time (such as FIGS. 3A-3C). As time progresses, the maximum current density diffuses outwards into the tubular 202B, and eventually increases elevated levels on the inner wall 306 of the tubular 202A, with current density decaying over time.

Figure 4:
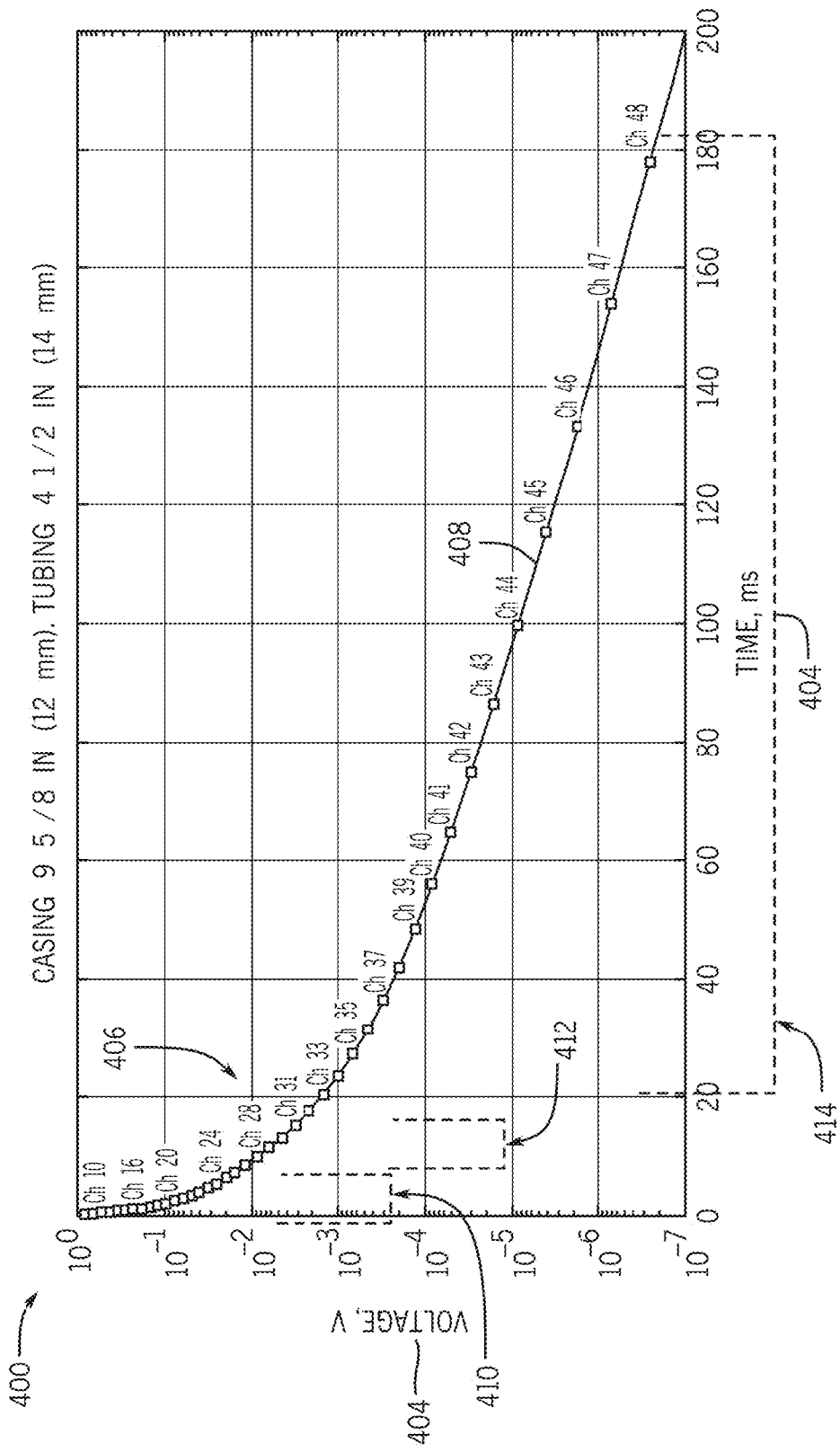
FIG. 4 is a graphical representation of an embodiment of a voltage over time in a tubular, in accordance with embodiments of the present disclosure.

FIG. 4 is a graphical representation 400 of voltage measured by a coil during a diffusion process, such as the process illustrated in FIGS. 3A-3F. In this embodiment, the x-axis 402 is time (milliseconds) and the y-axis 404 is voltage (V). The illustrated embodiment shows a plurality of time samples 406, with a fit line 408 extending through the time samples. It should be appreciated that more or fewer time sample may be used. In this configuration, different series of time samples 406 may be categorized by their associated time. For example, a first region 410, which includes approximately the first 15 samples, may correspond to "early" samples, a second region 412, which includes approximately the second 15 samples, may correspond to "mid" samples, and a third region 414, which includes the remaining samples may correspond to "late" samples.

The coil voltage, shown as the plot 408, is illustrated as a sharply decreasing curve. The voltage level at different times is used to interpret the condition of the barriers and whether or not there are metal loss features or metal gain features. If the voltage at each discrete time is plotted as a function of measured depth, a well log of discrete time voltages may be obtained. Current measurements and analysis provided by TEM tools for multi-barrier evaluation do not indicate whether the metal loss or gain feature is at the inner or outer surface of the barriers. Embodiments of the present disclosure, however, provide such an indication.

Figures 5A, 5B:
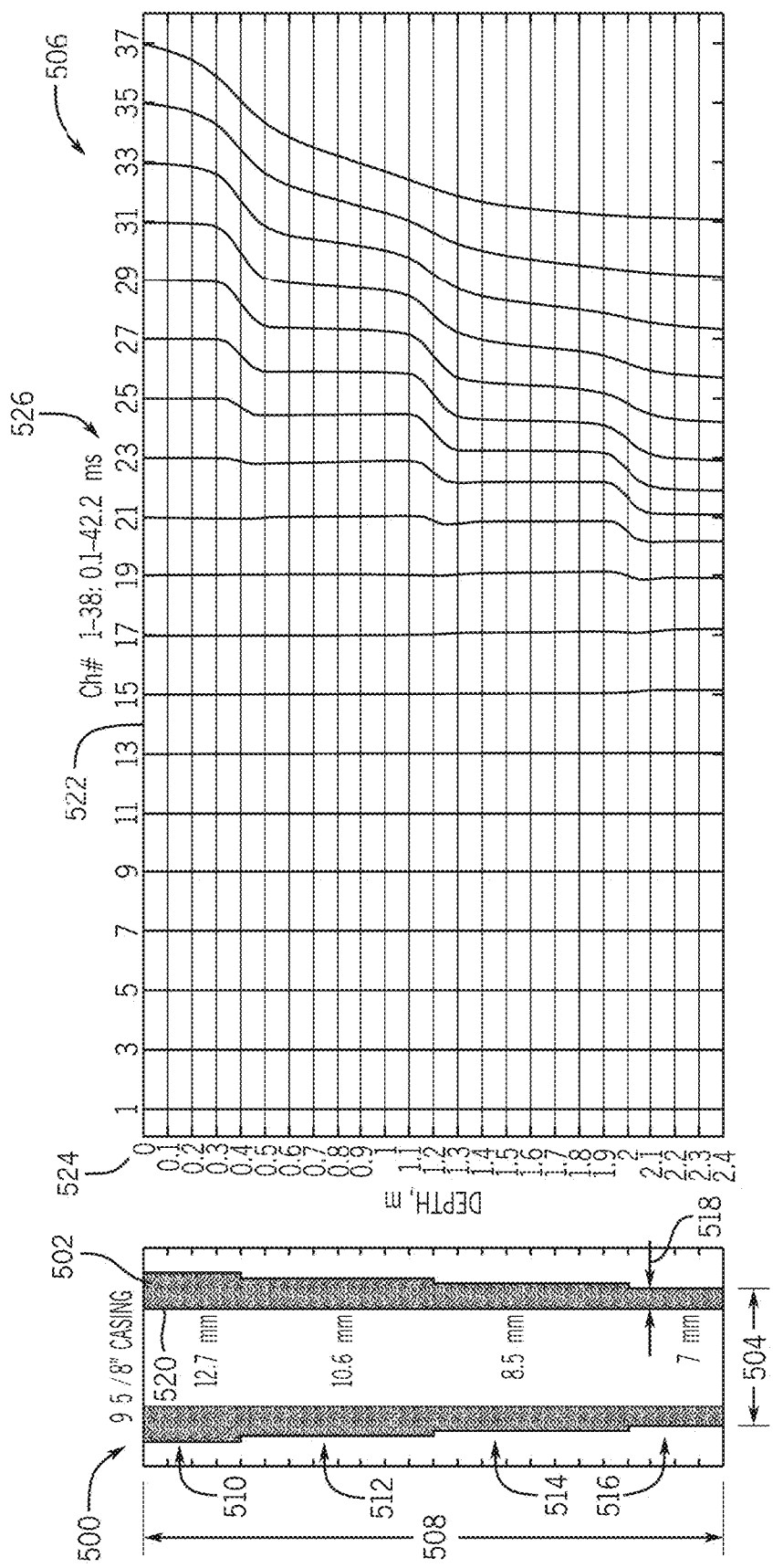
FIG. 5A is a cross-sectional view of an embodiment of a wellbore, in accordance with embodiments of the present disclosure.
FIG. 5B is a graphical representation of an embodiment of a well log, in accordance with embodiments of the present disclosure.

FIG. 5A is a cross-sectional view of an embodiment of a single barrier wellbore 500 that includes a tubular 502, represented as casing or production tubing, having a variable outer diameter 504 indicative of material loss. FIG. 5B is a graphical representation of a well log 506 corresponding to the single barrier wellbore 500. The illustrating casing 502 extends along a length 508 and includes a first section 510, a second section 512, a third section 514, and a fourth section 516, each section having a different thickness 518, represented by material loss along the outer diameter. As will be appreciated, an inner diameter 520 is illustrated as being constant along the length 508.

The illustrated embodiment shows that the wall thickness 518 for each respective section 510-516 decreases. This decreasing wall thickness is illustrated in the well log 506, which shows a percentage variation of voltage with respect to a suitable baseline value at each time sample. In the well log, the x-axis 522 represents time samples and the y-axis 524 represents depth (m), thereby enabling operators to correlate information to particular portions of the wellbore. In certain embodiments, the time samples correspond to a number of samples taken over a period of time. For example, in this example, there are 38 samples taken over a period of 0.1 to 42.2 ms. The baseline value may change as the tool moves deeper into the well, depending on the conditions of the barriers. As shown, different plots 526 are representative of different time samples (with certain time samples being removed for clarity). In this example, the early time samples (#1-15) are flat because they are sensitive to the inner wall of the casing 502, where there is no material loss. That is, the current density has not migrated to other parts of the casing 502, as illustrated in FIGS. 3A-3F. Mid time samples (#16-30) are more sensitive to thin barriers. Late time samples (#31-37) are insensitive to thin barriers and more sensitive to thick barriers. Accordingly, the different plots 526 illustrate the loss on the outer surface due to the sensitivity associated with the later time samples 526, which are indicative of the current density migrating to the outer surface of the casing 502.

Figures 6A, 6B:
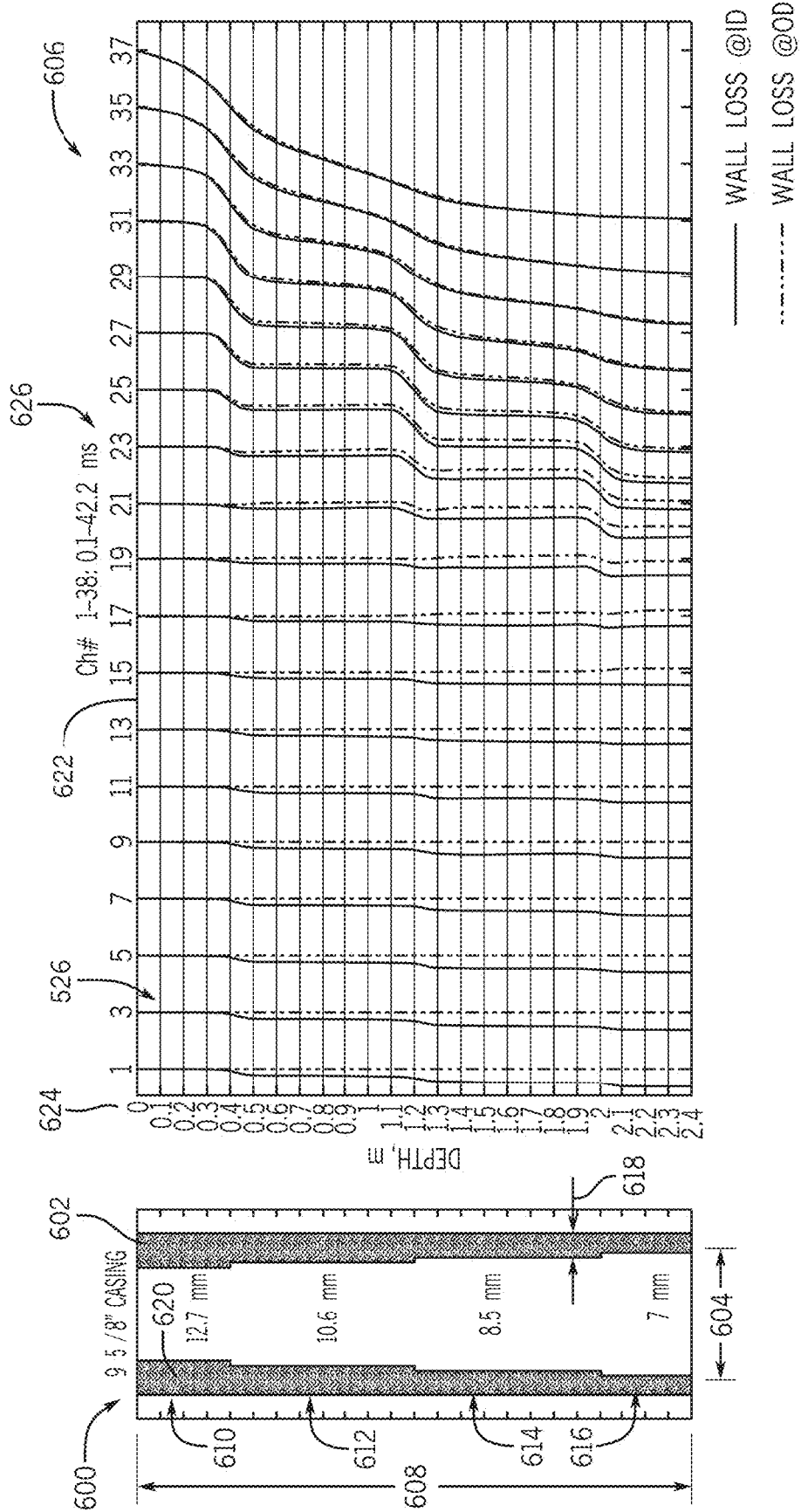
FIG. 6A is a cross-sectional view of an embodiment of a wellbore, in accordance with embodiments of the present disclosure.
FIG. 6B is a graphical representation of an embodiment of a well log, in accordance with embodiments of the present disclosure.

FIG. 6A is a cross-sectional view of an embodiment of a single barrier wellbore 600 that includes a tubular 602, represented as casing or production tubing, having a variable inner diameter 604 indicative of material loss. FIG. 6B is a graphical representation of a well log 606 corresponding to the single barrier wellbore 600. The illustrating casing 602 extends along a length 608 and includes a first section 610, a second section 612, a third section 614, and a fourth section 616, each section having a different thickness 618, represented by material loss along the inner diameter 604. As will be appreciated, an outer diameter 620 is illustrated as being constant along the length 608.

The illustrated embodiment shows that the wall thickness 618 for each respective section 610-616 decreases. This decreasing wall thickness is illustrated in the well log 606, which shows a percentage variation of voltage with respect to a suitable baseline value at each time sample. In the well log, the x-axis 622 represents time samples and the y-axis 624 represents depth (m), thereby enabling operators to correlate information to particular portions of the wellbore. The baseline value may change as the tool moves deeper into the well, depending on the conditions of the barriers. As shown, different plots 626 are representative of different time samples (with certain time samples being removed for clarity). Additionally, the plots 526 from FIG. 5B are overlaid to highlight the difference.

As illustrated, FIG. 6B shows a similar synthetic example of a single casing, but with wall thinning features on the inner surface. In this example, the plots 526 correspond to outer wall thinning and the plots 626 correspond to inner wall thinning. It can be seen that wall thinning on the inner surface of the casing is indicated by the earliest time samples (#1-15) which had been flat when the wall thinning was on the outer surface of the casing (FIG. 5B). As noted above, this indication is due, at least in part, to the current density interacting with the inner wall before migrating to the outer wall. Accordingly, thinning is identified on respective surfaces of the tubular, rather than just a general indication of thinning.

Figures 7A, 7B:
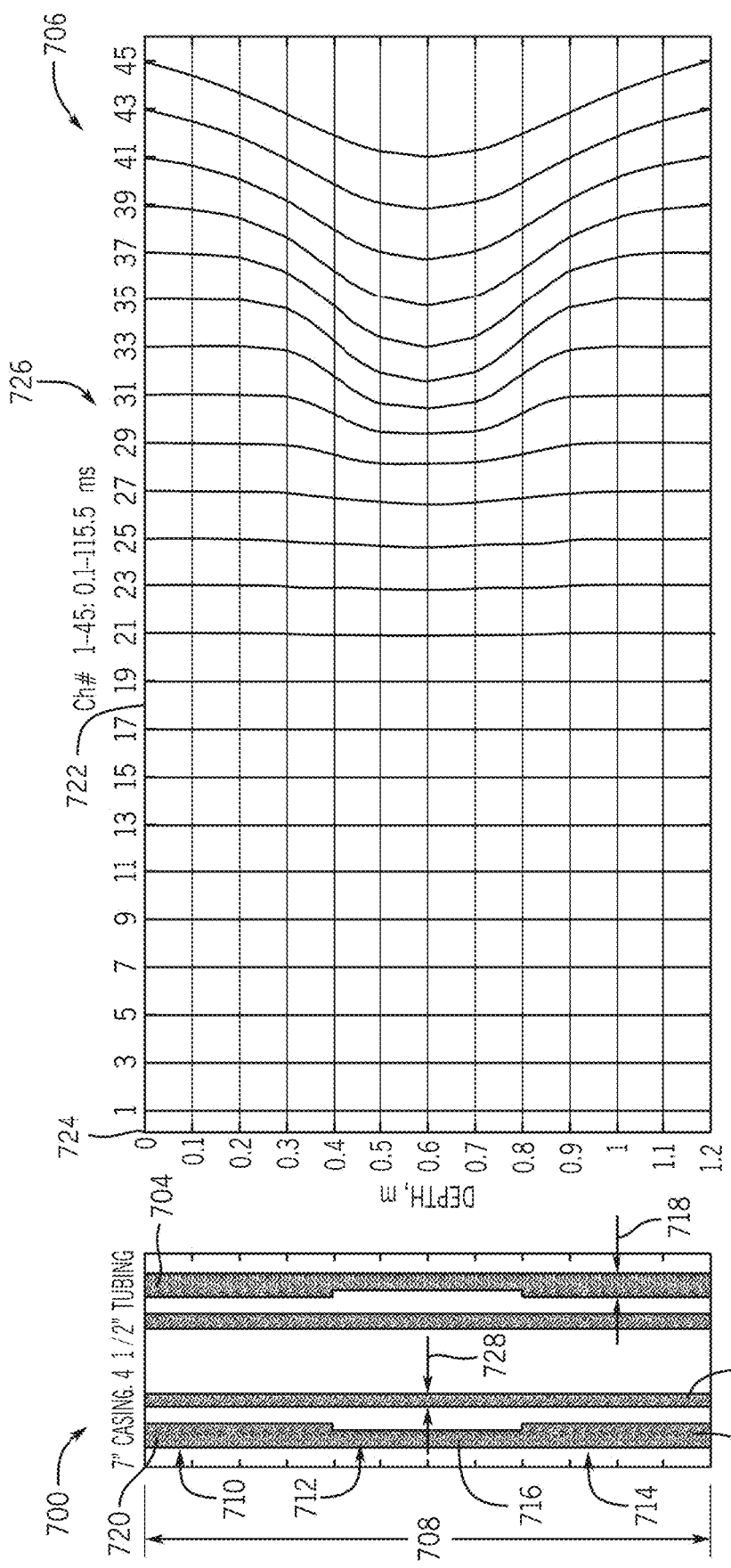
FIG. 7A is a cross-sectional view of an embodiment of a multi-barrier wellbore, in accordance with embodiments of the present disclosure.
FIG. 7B is a graphical representation of an embodiment of a well log, in accordance with embodiments of the present disclosure.

FIG. 7A is a cross-sectional view of an embodiment of a multi-barrier wellbore 700 that includes a pair of tubulars 702, 704, represented as casing. It should be appreciated that two barriers are shown for illustrative purposes only, and that other embodiments may include more barriers. In this example, the inner tubular is shown as 702 and the outer tubular is shown as 704. These tubulars 702, 704 are arranged co-axially. This example shows a void or loss in wall thickness at a particular region of the outer tubular 704. FIG. 7B is a graphical representation of a well log 706 corresponding to the multi-barrier wellbore 700. The illustrating casings 702, 704 extend along a length 708 and include a first section 710, a second section 712, and a third section 714. In this embodiment, the second section 712 corresponds to an area that has material loss along an inner surface 716 of the outer tubular 704. This section 712 has a different thickness 718 compared to the other sections 710, 714. As will be appreciated, an outer diameter 720 is illustrated as being constant along the length 708.

The illustrated embodiment shows that the wall thickness 718 for the second section 712 decreases. This decreasing wall thickness is illustrated in the well log 706, which shows a percentage variation of voltage with respect to a suitable baseline value at each time sample. In the well log, the x-axis 722 represents time samples and the y-axis 724 represents depth (m), thereby enabling operators to correlate information to particular portions of the wellbore. As an example, the time samples may include a collection of data sets 1-45 collected over a time of 0.1 ms to 115.5 ms. The baseline value may change as the tool moves deeper into the well, depending on the conditions of the barriers. As shown, different plots 726 are representative of different time samples (with certain time samples being removed for clarity).

The multi-barrier wellbore 700 includes the inner tubular 702 having a thickness 728, which is represented as being substantially constant along the length 708. The outer tubular 704 includes the thickness 718, which is different at the second section 712. As noted above, it is desirable to indicate whether the thinning is in the inner tubular 702 or the outer tubular 704, as well as whether the thinning is along the inner surface 718 or an outer surface 730.

The well log 706 illustrates metal loss on the inner surface 716, as measured through-tubing. In this case, time sample #25 is the earliest to indicate the metal loss, shown by the slight curve near the second section 712. Some of the later time samples (#31-41) indicate the metal loss even more clearly. As will be illustrated below, this loss along the inner surface 716 is distinguishable from loss on the outer surface 730.

Figures 8A, 8B:
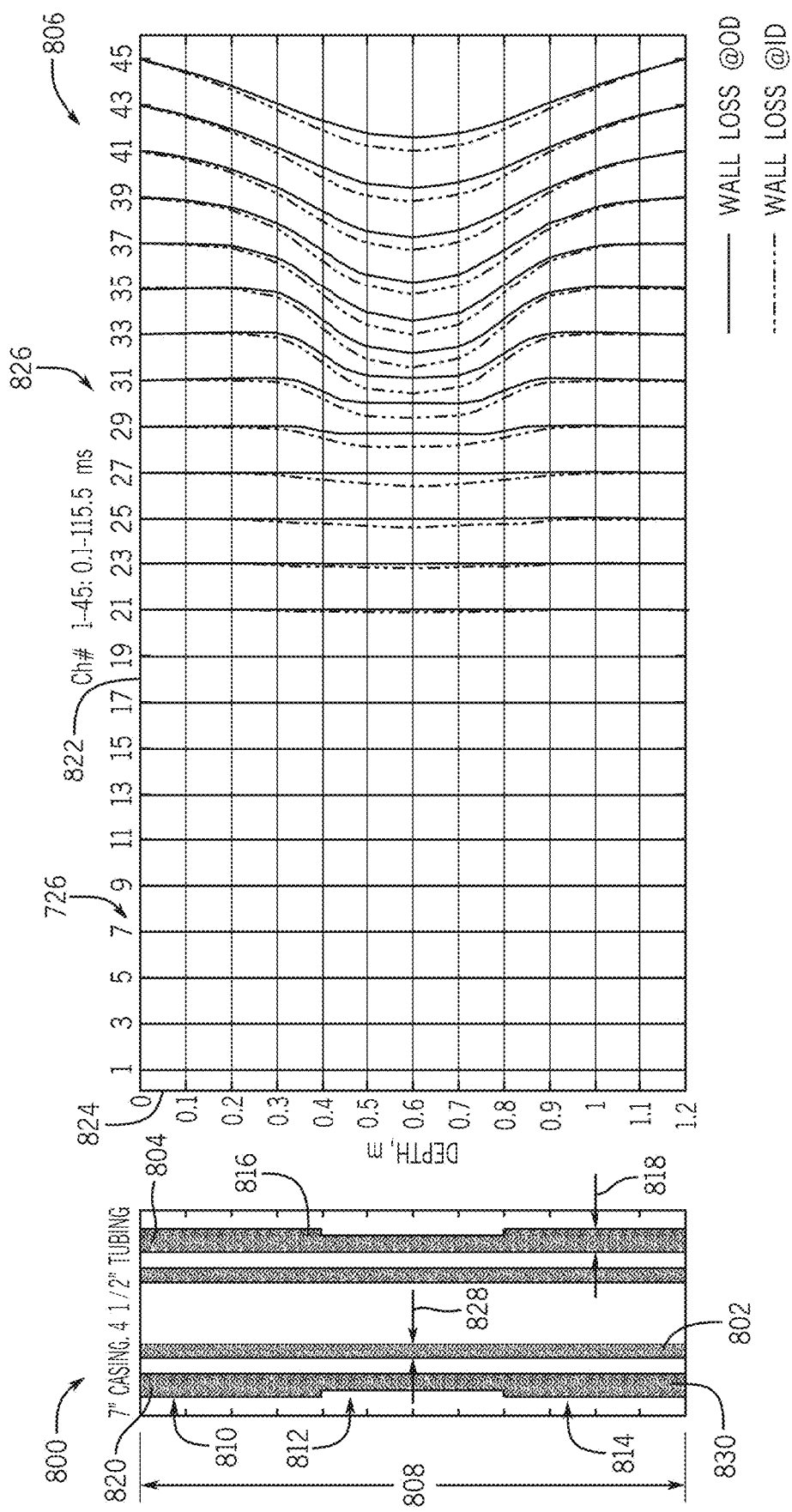
FIG. 8A is a cross-sectional view of an embodiment of a multi-barrier wellbore, in accordance with embodiments of the present disclosure.
FIG. 8B is a graphical representation of an embodiment of a well log, in accordance with embodiments of the present disclosure.

FIG. 8A is a cross-sectional view of an embodiment of a multi-barrier wellbore 800 that includes a pair of tubulars 802, 804, represented as casing. It should be appreciated that two barriers are shown for illustrative purposes only, and that other embodiments may include more barriers. In this example, the inner tubular is shown as 802 and the outer tubular is shown as 804. These tubulars 802, 804 are arranged co-axially. This example shows a void or loss in wall thickness at a particular region of the outer tubular 804. FIG. 8B is a graphical representation of a well log 806 corresponding to the multi-barrier wellbore 800. The illustrating casings 802, 804 extend along a length 808 and include a first section 810, a second section 812, and a third section 814. In this embodiment, the second section 812 corresponds to an area that has material loss along an outer surface 816 of the outer tubular 804. This section 812 has a different thickness 818 compared to the other sections 810, 814. As will be appreciated, an inner diameter 820 is illustrated as being constant along the length 808.

The illustrated embodiment shows that the wall thickness 818 for the second section 812 decreases. This decreasing wall thickness is illustrated in the well log 806, which shows a percentage variation of voltage with respect to a suitable baseline value at each time sample. In the well log, the x-axis 822 represents time samples and the y-axis 824 represents depth (m), thereby enabling operators to correlate information to particular portions of the wellbore. The baseline value may change as the tool moves deeper into the well, depending on the conditions of the barriers. As shown, different plots 826 are representative of different time samples (with certain time samples being removed for clarity).

The multi-barrier wellbore 800 includes the inner tubular 802 having a thickness 828, which is represented as being substantially constant along the length 808. The outer tubular 804 includes the thickness 818, which is different at the second section 812. As noted above, it is desirable to indicate whether the thinning is in the inner tubular 802 or the outer tubular 804, as well as whether the thinning is along the outer surface 818 or an inner surface 830.

The well log 806 illustrates metal loss on the outer surface 816, as measured through-tubing. It should be appreciated that the plots 726 have been overlaid on the well log 806 to illustrate the differences with identification of metal losses between the inner and outer surfaces. In this case, the earliest indication of the metal loss appears on time sample #29, as opposed to same #25 as shown in FIG. 7B. Beyond time sample #35, the metal loss signature is quite similar for both cases, when comparing FIGS. 7B and 8B, but the signature for internal wall loss is more pronounced.

Figures 9A, 9B:
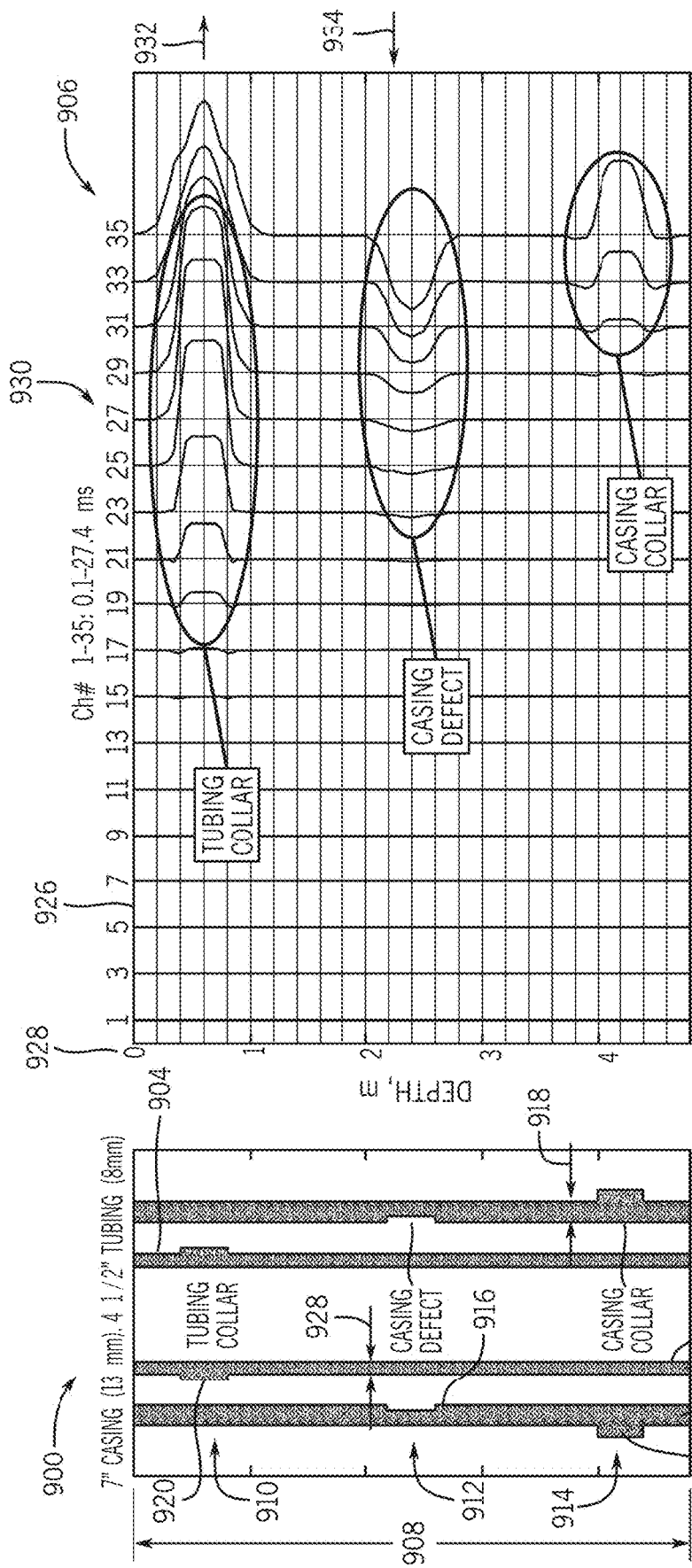
FIG. 9A is a cross-sectional view of an embodiment of a multi-barrier wellbore, in accordance with embodiments of the present disclosure.
FIG. 9B is a graphical representation of an embodiment of a well log, in accordance with embodiments of the present disclosure.

FIG. 9A is a cross-sectional view of an embodiment of a multi-barrier wellbore 900 that includes a pair of tubulars 902, 904, represented as casing and/or tubing. It should be appreciated that two barriers are shown for illustrative purposes only, and that other embodiments may include more barriers. In this example, the inner tubular is shown as 902 and the outer tubular is shown as 904. These tubulars 902, 904 are arranged co-axially. This example shows a void or loss in wall thickness at a particular region of the outer tubular 904, and also additional material at regions of both the inner tubular 902 and the outer tubular 904. FIG. 9B is a graphical representation of a well log 906 corresponding to the multi-barrier wellbore 900. The illustrating casings 902, 904 extend along a length 908 and include a first section 910, a second section 912, and a third section 914. In this embodiment, the second section 912 corresponds to an area that has material loss along an inner surface 916 of the outer tubular 904. This section 912 has a different thickness 918 compared to the other sections 910, 914.

In this embodiment, a tubing collar 920 is arranged at the first section 910, which corresponds to added material. As noted above, it may be desirable to identify regions of additional material to identify collars, hangers, and the like within the wellbore. Additionally, a casing collar 922 is positioned at the third region 914. As will be appreciated, both the tubing collar 920 and casing collar 922 are positioned along respective outer surface 924A, 924B of the tubulars 902, 904.

The well log 906 shown in FIG. 9B may be used to recognize a signature to facilitate identification of material loss and material gain. For example, in the illustrated embodiment, the x-axis 926 represents time samples and the y-axis 928 represents depth (m), thereby enabling operators to correlate information to particular portions of the wellbore. The baseline value may change as the tool moves deeper into the well, depending on the conditions of the barriers. As shown, different plots 930 are representative of different time samples (with certain time samples being removed for clarity).

The tubing collar 920 is represented in the first section 910 at approximately sample #19 and has an opposite direction 932 as compared to the representation of material loss shown at approximately sample #23 in the second section 912, which shows a signature in a different direction 934. This similar signature or shape is also illustrated at approximately sample #31 in the third section 914. Accordingly, it can be seen that features that are radially closer to the TEM tool appear earlier in the time sample logs than features that are radially outwards. In other words, there is a clear radial location-to-time sample correlation. As a result, this correlation may be used to differentiate between inner and outer features.

Additional examples presented herein further illustrate the correlation described above. For example, various examples illustrate measurements taken within the presence of measurement noise and utilize a state of the art TEM tool with three different sensors: a short coil, a medium coil, and a long coil. These three sensors have different signal-to-noise characteristics and different depths of investigation, but are otherwise similar Model-based inversion, which would use all measured time samples, could be able to demonstrate this radial location-to-time sample correlation as well, however simply using visual inspection enables feature location. Moreover, in various embodiments, machine learning algorithms may be implemented to the same end.

Figure 10A:
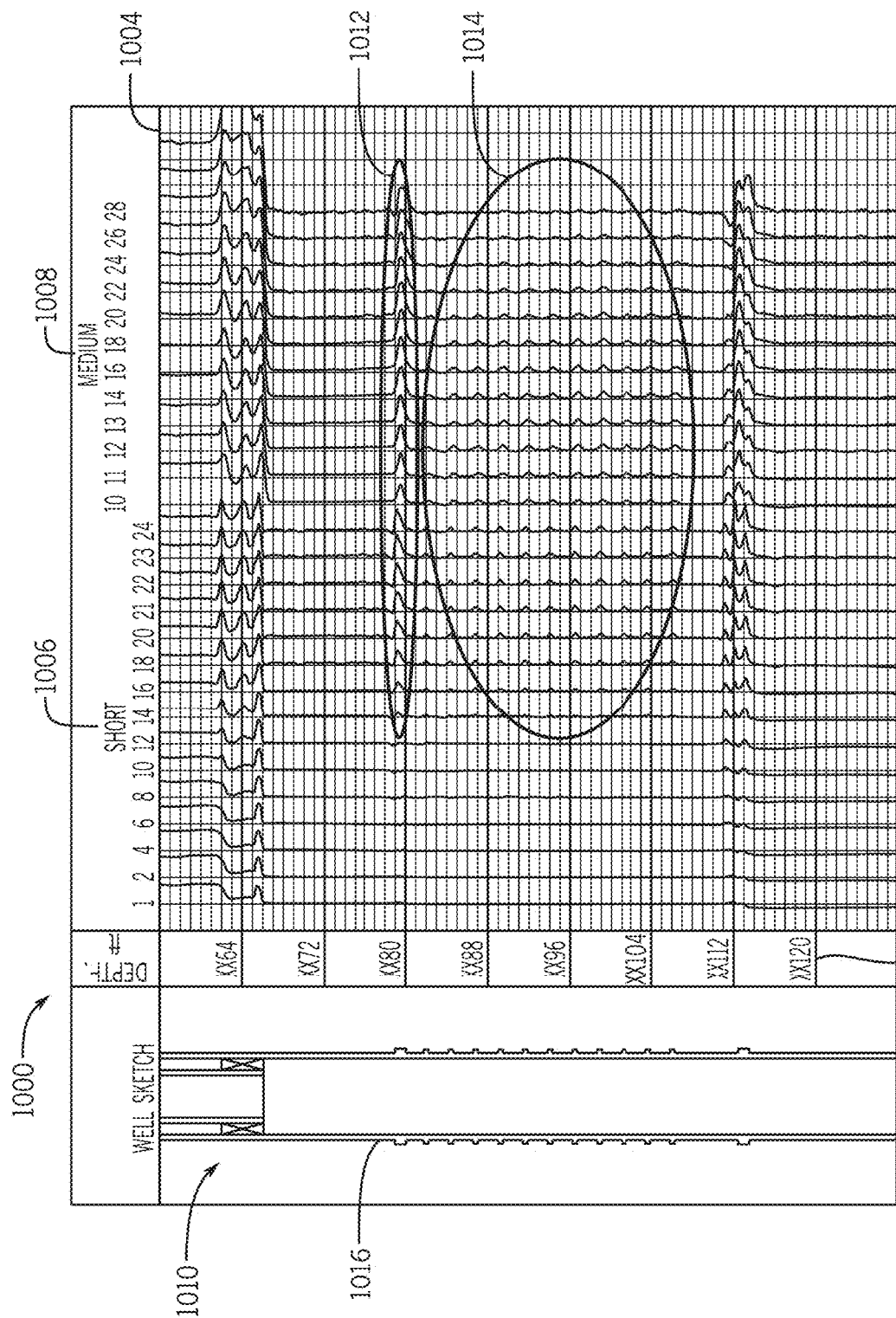
FIGS. 10A and 10B are graphical representations of embodiments of well logs representative of a multi-barrier wellbore, in accordance with embodiments of the present disclosure.
Figure 10B:
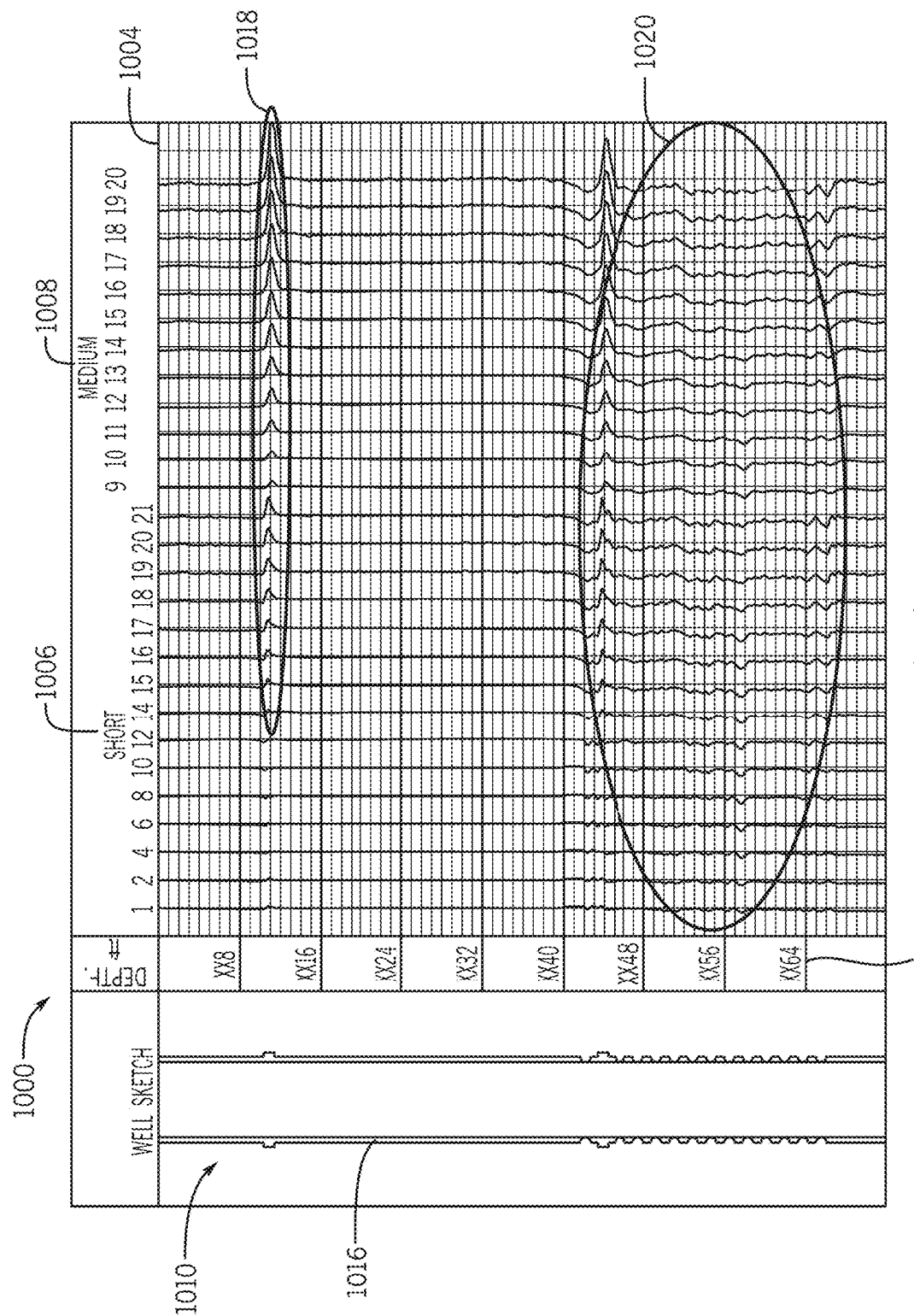

FIGS. 10A and 10B are graphical representations 1000 of well logs illustrating a variety of different features. In various embodiments, the well logs may be for single or multi-barrier wells. The y-axis 1002 corresponds to depth while the x-axis 1004 corresponds to samples. Turning to FIG. 10A, a set of short plots 1006 and medium plots 1008 are presented. Only selected samples are shown for clarity and are displayed in order of increasing time. In this embodiment, the plots 1006, 1008 correspond to the well cross-section 1010. As illustrated, the multi-sensor TEM data illustrates material gain (e.g., casing collar) as identified by a first signature 1012. This signature shows up as early as short sensor time sample #14. The signature grows stronger at later time samples (shown along the x-axis). How early each feature signature appears provides information, such as which barrier the feature is located on, which surface (inner or outer) of the barrier the feature is located on, and how thick each barrier is. Collar signatures are some of the clearest features visible on multi-barrier TEM logs. Because prior information that these features occur on the outer surface of each barrier is known, the collar signatures may be used as a reference with which to locate all other features. A second signature 1014 also representing material gain (e.g., additional hardware/scratchers etc.) appears at short sensor time sample #14. Comparing this to the collar signature 1012, which may be used as a reference location, it is determined that this metal gain occurs on the outer surface of the casing. For example, the "direction" of each of the signatures is the same, indicative of material gain on the outer surface.

FIG. 10B may be a representation of the same well as FIG. 10A, but may be at a different depth, and also includes the cross-section 1010. As previously indicated, the cross-section is representative of a tubular 1016 that may include regions or features that can be identified using embodiments of the present disclosure. In this embodiment, a third signature 1018 is indicative of material gain and represents a casing collar. As will be appreciated, the direction of the signature of the third signature 1018 is the same as the first and second signatures 1012, 1014. In contrast, a fourth signature 1020 is indicative of material loss, which may be deduced by the direction of the signature being in an opposite direction as the signatures 1012, 1014, 1018. The feature signature appears on the very first time sample, and then gains better definition as time progresses. Comparing this to the collar signature 1018, which may be used as a reference location, it is determined that this metal loss feature occurs at the inner surface of the casing because of the early detection, which will be radially closer to the tool. Furthermore, the fact that this signature gains definition at later time samples and keeps gaining definition until the very last time sample displayed indicates that this metal loss has penetrated through the thickness of the casing.

Based on the logs illustrated above, it may be determined that often, a few intermittent time samples which show the most pronounced signatures of metal loss or gain are enough to do a quantitative interpretation or inversion for the amount of metal loss or gain. However, a full-scale multi-barrier evaluation includes a thorough examination of substantially all time samples recorded by substantially all sensors. The earlier time samples and later time samples contain important clues to the location of features. Moreover, pipe collars are an important asset for interpretation. Since their radial location is known apriori, they not only help with calibration of modeled data but also help with visual interpretation of measured data. With the help of pipe collar signatures, it is usually feasible to determine the radial location of metal loss and gain features simply by visual inspection of measured logs. Of course, quantitative interpretation still utilizes model-based inversion. Furthermore, barrier inspection should be performed at multiple levels. The top level may be the complete well log as a whole, which can indicate end of pipe locations as well as anomalous pipe joints. The bottom level may be a single joint of pipe at a time, which can yield more details about local flaws and features. The reference signal level at each time sample may be picked from a feature-free location closest to the pipe joint being inspected. Targeted features may include, but are not limited to corrosion, perforations, grooves, scratches, centralizers, deformations, decentralization, centralizers, multiple barriers, casing and tubing thickness, eccentricity, buckling, etc.

Figure 11:
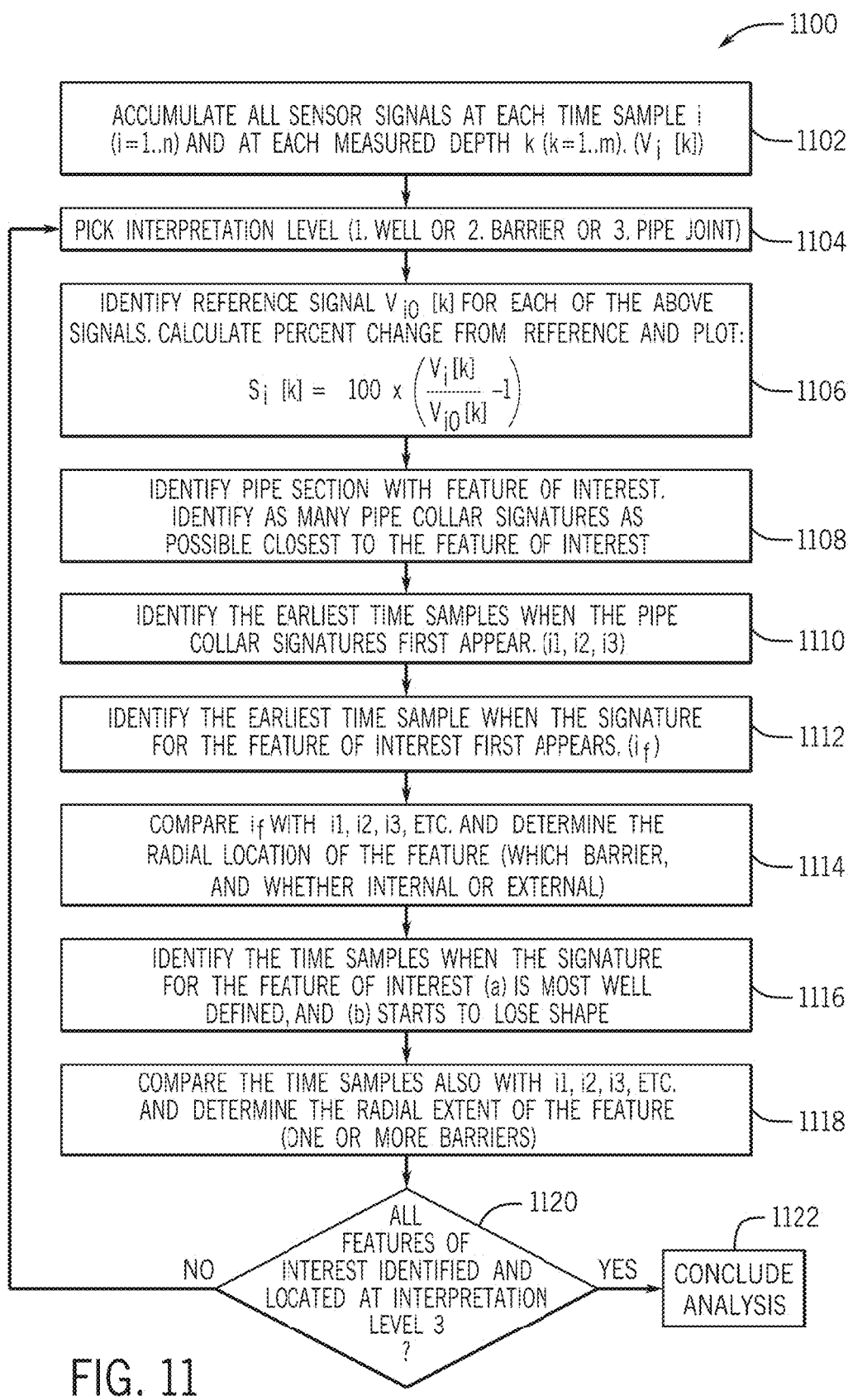
FIG. 11 is a flow chart of an embodiment of a method for identifying a feature of interest, in accordance with embodiments of the present disclosure.

FIG. 11 is a flow chart of an embodiment of a method 1100 identifying features of interest in a wellbore. It should be appreciated that for this method, and any other method described herein, that there may be more or fewer steps. Additionally, the steps may be performed in a different order, or in parallel, unless otherwise specifically stated. Embodiments may be directed toward identifying features of interest, which may correspond to areas of tubulars having material loss or material gain.

In this example, a plurality of sensor signals may be received, for example from a TEM device where data is acquired over a period of time. Furthermore, the sensor signals may be acquired over a period of time, where intervals over the period of time correspond to individual, discrete time samples. Sensor signals for each time sample may be acquired at measured depths 1102. In this example, the time sample may be represented as i where i=1 ... n and each measured depth may be represented as k, where k=1 ... m. These sensors signals may be collectively referred to as Vi[k]. In other words, the sensor signals correspond to a signal received at a particular time associated with a particular depth, such as the signals shown herein corresponding to the various well logs.

An interpretation level may be selected 1104. For example, the interpretation may correspond to which radial position, relative to the tool, is the focus of the analysis. By way of example, analysis may be performed over the well (designated as 1), a barrier in the well (designated as 2), or a tubular joint (designated as 3). As described above, various different interpretations may provide landmarks or other identifications for further analysis. For example, locations of pipe joints or collars may be known within a degree of specificity.

Reference signals are identified for each sensor signal $V_{i0}[k]$ and compared to an existing signal 1106. For example, a tubular thickness may be known. Signals may be evaluated over a region of the wellbore where it is unlikely for damage to occur, and as a result, a reference may be established. Furthermore, in certain embodiments, lab results or a synthetic signal may be utilized as the reference signal. The comparison, in various embodiments, may be directed toward identifying a percent change between the reference and the current signal, as represented by Equation 1.

$$S_i[k] = 100 \times \left(\frac{V_i[k]}{V_{i0}[k]} - 1\right) \quad \text{(Equation 1)}$$

A pipe section that includes a feature of interest may then be identified 1108. In various embodiments, the features may be identified with reference to other features, such as pipe collars or the like. As noted above, the collars may be indicative of added material, which may include a distinct signature compared to a signature indicative of material loss. Further analysis of the pipe section may include identifying an earliest, or group of earliest, time samples associated with the pipe collar signature 1110. This may enable characterization of the feature of interest, as described above. For example, it is known that a pipe collar is on the outer diameter of a tubular, and as a result, a feature of interest identified by a signature earlier in time than the pipe collar may be correlated to the feature of interest being radially closer to the tool, which may correspond to an inner diameter.

An earlier time, or group of earliest times, may be identified for the feature of interest 1112. The times for the feature of interest are compared to the times for the pipe collar 1114. As noted above, this may facilitate determination of the feature's location (e.g., closer to the tool or farther from the tool). Additional analysis may include identification of a time, or group of times, where the feature of interest is more well defined and/or where the feature starts to lose shape 1116. This information may then be utilized to determine a radial extent of the feature of interest 1118. For example, if the feature of interest begins earlier in time than the pipe collar and ends approximately where the pipe collar begins, the feature of interest may be indicative of loss extending through the entire tubular. This example may then determine whether additional features have been identified 1120, for example at a different level of interpretation, and may proceed to evaluate these features if so, or may end the analysis 1122 if not. In this manner, different time signatures may be evaluated against a baseline or reference to identify features of interest within the wellbore. Furthermore, comparison with known landmarks or structure may facilitate determination of a radial location of the feature of interest.

Figure 12:
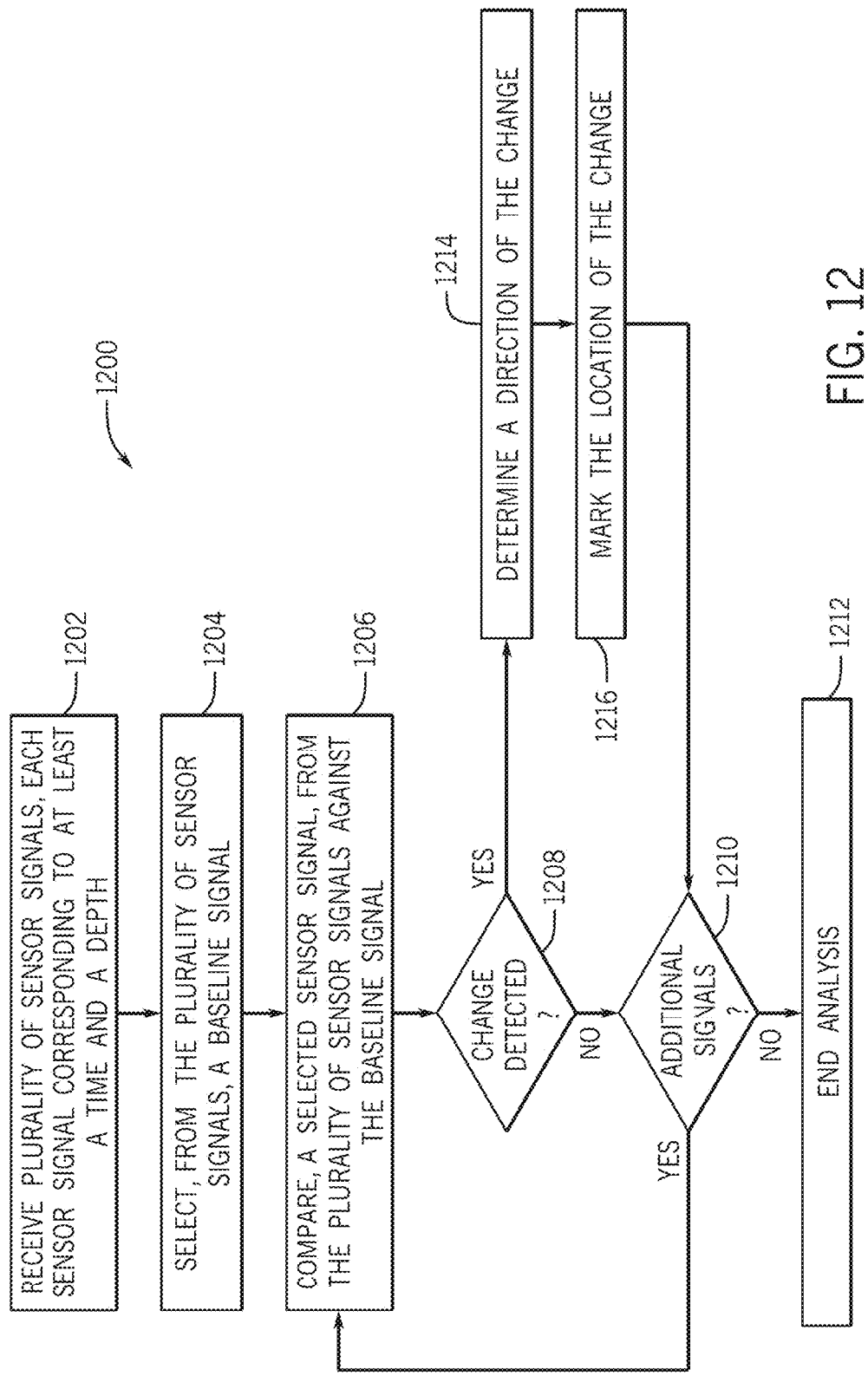
FIG. 12 is a flow chart of an embodiment of a method for identifying a feature of interest, in accordance with embodiments of the present disclosure.

FIG. 12 is a flow chart of an embodiment of a method 1200 for identifying a feature of interest in a well log. In this example, a plurality of sensor signals, such as the plots illustrated herein, are received 1202. As described above, the sensor signals may correspond to signals received over a period of time and correspond to a particular depth. A signal is selected from the plurality of sensor signals to serve as a baseline signal 1204. It should be appreciated that the baseline signal may be particular for a given section of the wellbore. That is, the baseline signal may be modified or changed for different wellbore regions. Furthermore, it should be appreciated that the reference signal may also be a simulated signal that is predesignated as the reference or baseline signal. In certain embodiments, the reference signal may come from physical measurements that are processed through a model and compared to a simulation and, though an iterative process, the simulation may be improved. The reference signal may come from a database, table, or pre-built library. Furthermore, the reference signal may be a hybrid signal combining a number of different values, such as a library that includes values that have been augmented with simulation data. As a result, software executing on the tool may be utilized to receive data and query the library to identify matching parameters. A signal is selected, from the plurality of signals, and compared with the baseline signal 1206. For example, a shape of the signal may be compared and/or values for different point along the signal may be compared. A change may be evaluated 1208, for example, to determine whether the change exceeds a threshold amount. The threshold, in various embodiments, may correspond to a percentage change and/or a set value.

If there is no change, the plurality of signals may be checked to determine whether additional signals remain 1210. If not, the analysis ends 1212. If there are additional signals, the different signal is selected for analysis.

If there is a change between the reference signal and the selected signal, a direction of the change is determined 1214. As described above, a direction of the change may refer to a value, such as a current density. As will be appreciated, a reduced quantity of current density may be representative of material loss, while an increased current density may be representative of material gain. Accordingly, the direction of the change may correspond to whether the current density is increasing or decreasing. This location is then marked for further evaluation 1216. For example, additional changes may be analyzed and built up to identify a section of the wellbore with a feature of interest. From there, the feature may be identified as a material loss or material gain. Furthermore, by comparing different features, a location of the feature may be identified as being on an interior surface or an exterior surface.

Figure 13:
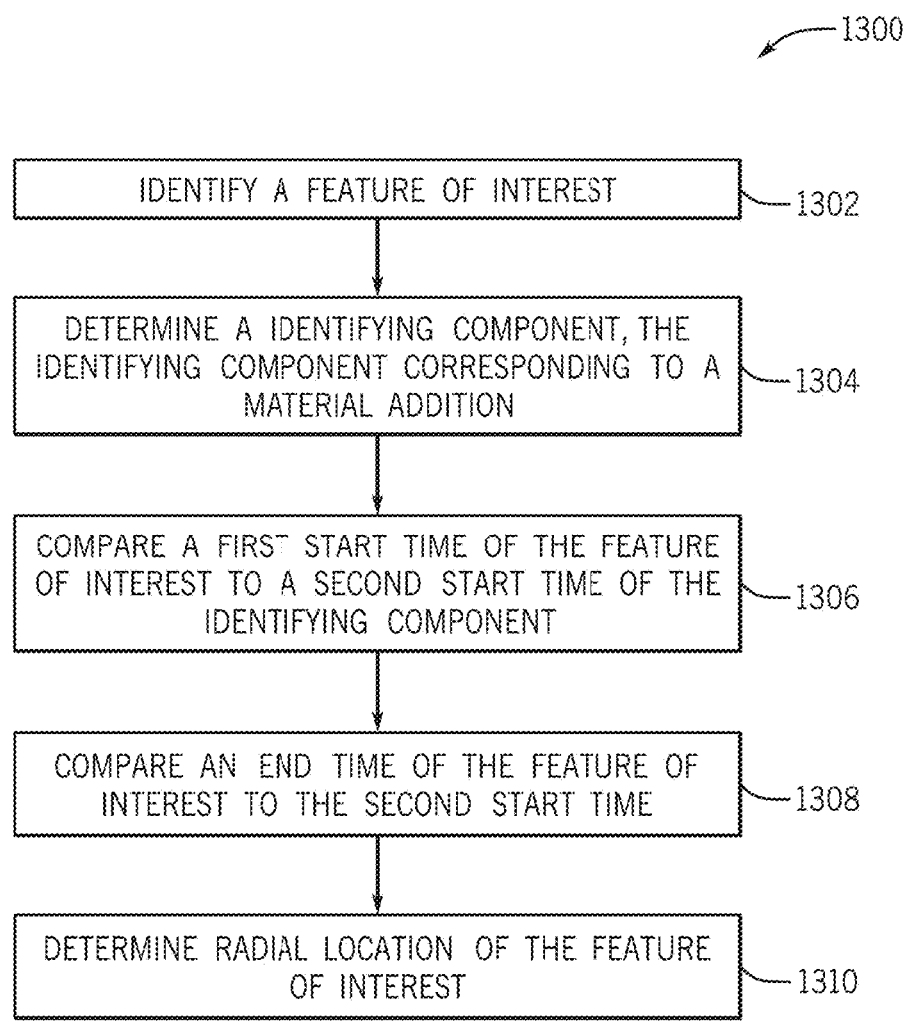
FIG. 13 is a flow chart of an embodiment of a method for identifying a feature of interest, in accordance with embodiments of the present disclosure.

FIG. 13 is a flow chart of an embodiment of a method 1300 for identifying a radial location of a feature of interest. A feature of interest is identified 1302, for example by analyzing a well log as described herein. An identifying component is also identified 1304. The identifying component may correspond to a collar or the like. The identifying component may correspond to a material additional and, in embodiments, may be at a known or substantially known location. A first start time for the feature of interest is compared to a second start time of the identifying component 1306. For example, various plots and/or values may be analyzed against a reference to determine a first time when a difference exceeds a threshold. An end time of the feature of interest is also compared to the second start time 1308. Analysis of the differences between the start and end times may be used to determine a radial location of the feature of interest 1310. For example, if the feature of interest starts and stops before the identifying component, it is likely that the feature of interest is associated with a radially inward portion, such as an interior tubular wall. If the feature of interest starts before the identifying component and ends when the identifying component begins, it is likely to correspond to an outer wall material loss. If the feature of interest starts very soon (e.g., close to a first time signal) and extends to the start of the identifying component, it may be indicative of material loss of the entire wall. It should be appreciated that this concept may be expanded to multiple barriers, as described above, to identify features of interest in multi-barrier wells.

FIG. 14 is a schematic diagram of a TEM tool 1400. In this embodiment, the tool 1400 includes three-dimensional (3D) arrays having multiple taps accessible to transmitters and receivers electrically connected or coupled through multiplexing means to obtain multiple EM survey modes of multiple barriers in wells. The various magnetic moments (e.g., M, M$_+$, M$_{-A}$, and M$_{-B}$) listed and indicated in FIG. 14 can be generated by coils 1402 connected by tap terminals 1404 with an adaptive configuration multiplexing controlled network of coil segments. Additional multiplexed network of coils can be collocated and oriented in 3-D survey orthogonal orientation (e.g., X, Y, and Z) thoroughly surveying the surrounding downhole environment with a multi-component EM surveying tool. The 3D EM coil network can be alternatively oriented non-orthogonally, provided the coil measurements can be decomposed to compute an equivalent orthogonal 3D coil network array.

Embodiments of the present disclosure may operate in three primary modes. These EM survey primary modes are single coil mode realized via multiplexing connections to coil M$_+$ (taps number 2 and 3) or other array coils taps with varying lengths with different transfer functions producing different depth and vertical resolutions. The second EM survey mode is differential dual coil mode realized for example through the multiplexing connection in series of coils M$_+$ (tap numbers 2 and 3—positive polarity) and M$_{-A}$ plus M$_{-B}$ (tap numbers 3 and 5—negative polarity). The moment of M$_+$ equals the sum of the moments of M$_{-A}$ plus M$_-$. The third EM survey mode is the focused three-coil array mode realized with multiplexing connection for example coil M– (tap numbers 1 and 2—negative polarity), coil M$_{+A}$ (tap numbers 2 and 3—positive polarity) and coil M$_{+B}$ (tap numbers 3 and 5—positive polarity).

Each EM survey mode described above can obtain additional sensitivity enhancement survey measurements obtained by an array variation of multiple coil lengths and magnetic moment values with different sensitivities, depth and vertical resolutions operationally taking the various measurements with the multiplexing configuration network. The interpretation of the combined EM survey modes described above yield an improved interpretation as each is particularly sensitive to different parts of the casing and completion structure geometry with installation assembly components and position plus other features targeted for detection qualitatively and evaluated quantitatively. These targeted features could be corrosion, perforations, grooves, scratches, centralizers, deformations, decentralization, centralizers, multiple barriers, casing and tubing thickness, eccentricity, buckling, etc.

FIG. 15 is a schematic representation of receiver and transmitter multiplexing 1500. The illustrated representation includes transmitter array 1502 and receiver array 1504, each couple to the coil array 1506. In various embodiments, transmitters and receivers can timely operationally be multiplexed, exciting different coil array combinations, multiplexed receivers selective sensing multiplexed network of coils or sensors or equivalent EM sensors operationally timely taking the necessary data signal measurements from various coil array combinations shown and discussed for FIG. 14. The illustrated embodiment may be described with reference to a multi-component magnetic moment tensor array matrix, illustrated as a 3×3 matrix.

$$\begin{matrix} M_{xx}^{n,o} & M_{xy}^{i,j} & M_{xz}^{j,k} \\ M_{yx}^{k,l} & M_{yx}^{l,n} & M_{yz}^{m,n} \\ M_{zx}^{n,k} & M_{zy}^{o,p} & M_{zz}^{p,q} \end{matrix}$$

Various coil configurations yield the matrix diagonal and cross-components multi-component EM measurements data by properly connecting the multiplexing network of coils, receiver and transmitter described in FIGS. 14 AND 15. Each of the matrix diagonal and off-diagonal (i.e. cross-components) components defined by a convention associated with the EM sensors (e.g. coil) axis of directions involved in the transmission (i.e. transmitter excitation) and sensing (i.e. receivers). Each matrix component can have additional dimensionality (3×n) established by one of the three EM survey modes described in FIG. 14 (i.e. single, differential, and focused) and one of its sensor's n length dimensions within the array. For example, the notation for the matrix Magnetic Moment component measurement M$_{xy}^{j,k}$ denotes a transmission excitation in the X direction, a receiver sensing in the Y direction, EM survey mode j and coil length k. For example, if each matrix component had two length sizes, the total number of measurements from all EM survey modes, orientation combinations and sensor configurations would be 54 (3×3×3 modes×2 sizes).

FIG. 16A is a schematic representation of a rotating tool section 1600 and FIG. 16B is a schematic diagram illustrating the tool system 1602. The rotating tool section 1600 may be connected at the bottom of a downhole operating tool string 1604. The rotating section 1600 rotates relative to the tool string 1604 above by a motor 1606 in the section above the rotating head interface. The section above the rotating interface contains a power supply module 1608, the motor 1606, a rotating gear 1610, a controller 1612 monitoring and operationally controlling the rotation tool section 1600. This controller also receives and transmits rotating section's measurements to other tools in the downhole tool string and to the surface equipment directly or indirectly, for example via an interface 1614. The controller may include one or more processors and a memory that may store instructions executable by the one or more processors. It should be appreciated that the controller may be a downhole controller or a surface controller, and moreover, that various actions of the controller may be performed by one or both of the downhole controller and/or the surface controller. The interface may be communicatively coupled to various wellbore systems, such as other components within the tool and/or components at the surface. The rotating section 1600 has EM sensors 1616 (e.g. coils) and acoustic (e.g. ultrasonic, pressure, piezoelectric) sensor 1618 arrays. The rotating section has transmitter and receiver modules 1620, 1622 along with transmitter and receiver multiplexing networks 1624, 1626, such as those networks described above. All modules in the rotating section 1600 may have some self-controlling functionality and are all controlled by the controller 1612 in the opposite side of the rotating interface 1614. The rotating interface 1614 transmits power, telemetry data, measurements, controls, and monitoring signals between the rotating section and the non-rotating tool section. The acoustic sensors 1618 including transmitting and sensing devices and are not constrained to a particular acoustic survey method but can be of compression, flexural, pulse-echo, ultrasonic and other acoustic survey methods. The rotating section 1600 provides a means to perform synchronized EM and acoustic surveys and both directed to the same volumetric zone.

Figure 17A:
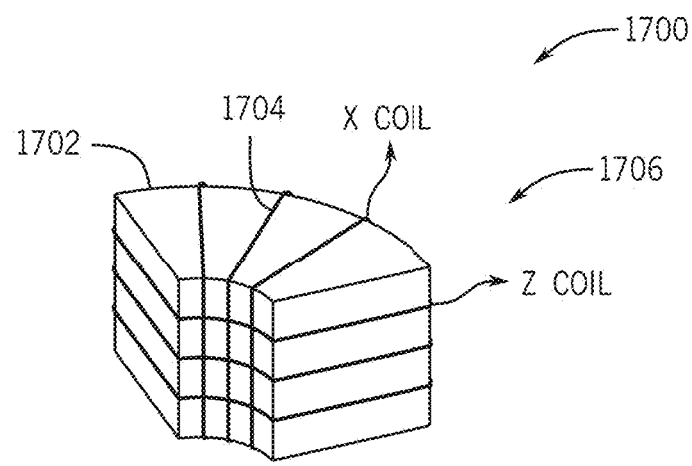
FIG. 17A is a perspective view of an embodiment of a composite sensor, in accordance with embodiments of the present disclosure.
Figure 17B:
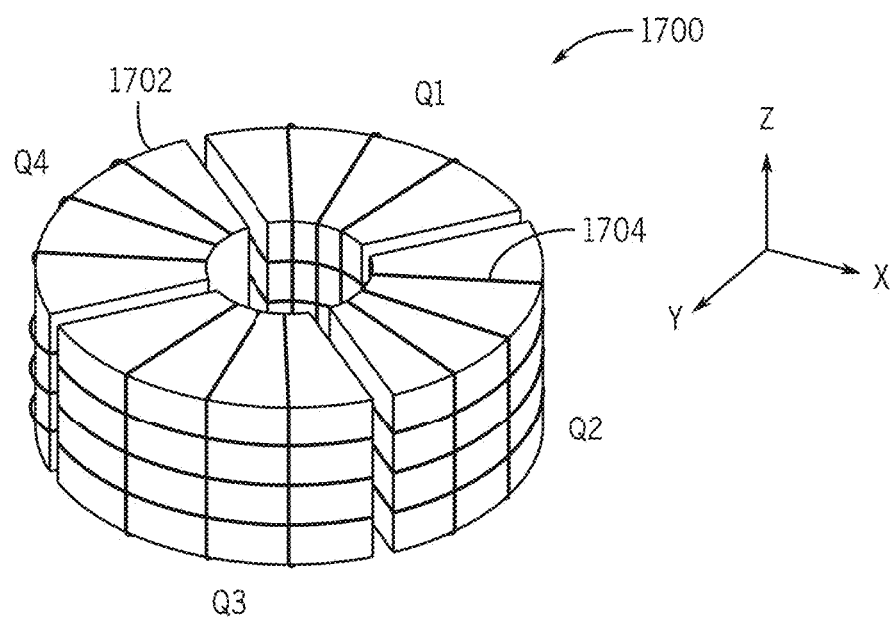
FIG. 17B is a perspective view of an embodiment of an azimuthal sensor array, in accordance with embodiments of the present disclosure.

FIGS. 17A and 17B are schematic representations of a collocated system 1700 having transmitters/receivers/sensors with azimuthal sensitivity. This azimuthal sensitivity is obtained by segmenting cores 1702 and associated coils 1704. The illustrated embodiment includes a four quadrant configuration, but it should be appreciated that more segments can be utilized to obtain higher resolution. The segments are labeled as Q1-Q4. Each segment may be formed by a composite sensor 1706 that includes the core 1702 and coils 1704. The core 1702 may comprise any suitable material with high magnetic permeability. Suitable materials may include, but are not limited to, ferrite, nickel steel, silicon steel, amorphous ribbons, alloy powder core, etc. The coils 1704 from each segment may be processed/driven separately to yield maximum azimuthal resolution, or may be combined together for lower resolution but higher signal-to-noise ratio. The X/Y/Z-coil signals from each segment may be added together to obtain the bulk X/Y/Z-direction measurements, respectively. Each segment may be driven/processed combinatorially to yield dipole, quadrupole, etc. measurements. It should be appreciated that four quadrants are shown for example purposes only along with the four coils. In other embodiments there may be more or fewer. For example, there may be 3 total coil arrays, 5 total coil arrays, 10 total coil arrays, or any reasonable number. In certain examples, there more than 3 total coil arrays, more than 10 total coil arrays, or more than 15 total coil arrays.

As noted above, the coils may operate with three different configurations, such as a single coil mode, a differential coil mode, and a focused coil mode. As a result, there are a total of 30 potential survey modes (the three coil configurations times the different quadrant configurations. Table 1 illustrates the different survey modes, where T corresponds to transmitting and R corresponds to receiving.

TABLE 1

| Configuration | Q1   | Q2   | Q3   | Q4   |
|---------------|------|------|------|------|
| 1             | R    | R    | R    | T, R |
| 2             | T, R | R    | R    | R    |
| 3             | R    | T, R | R    | R    |
| 4             | R    | R    | T, R | R    |
| 5             | T, R | R    | R    | T, R |
| 6             | T, R | T, R | R    | R    |
| 7             | R    | T, R | T, R | R    |
| 8             | R    | R    | T, R | T, R |
| 9             | T, R | T, R | T, R | T, R |
| 10            | T, R | T, R | T, R | T, R |

Furthermore, it should be appreciated that a variety of different configurations may be utilized to drive and receive the survey signal. Table 2 provides these configurations, where T correspond to transmitting, R corresponds to receiving, (+) corresponds to positive, and (−) corresponds to negative.

TABLE 2

| Configuration | Q1       | Q2       | Q3       | Q4       |
|---------------|----------|----------|----------|----------|
| 1             | R (−)    | R (−)    | R (−)    | T, R (+) |
| 2             | T, R (+) | R (−)    | R (−)    | T, R (+) |
| 3             | R (−)    | T, R (+) | R (−)    | T, R (+) |
| 4             | T, R (+/−) | T, R (+/−) | T, R (+/−) | T, R (+/−) |

FIG. 18 is a cross-sectional view of an embodiment of a tool configuration 1800. The illustrated configuration includes five measurement arrays 1802 (0-4) where the array 0 is a centralized array and arrays 1-4 are decentralized. It should be appreciated that the arrays may operate independently taking signal receiver measurements induced by its own excitation, or may operate inter-dependently. For inter-dependent operation, excitation generated by one of the array causes a surrounding media induced response measured by a receiver measurement located in a different array receiver or a group of different receiver arrays within the tool assembly as indicated in the cross-section. Each array 1802 can be a three-dimensional multi-component electromagnetic measurement tool. Each array's multi-component sensors (e.g. X-X, X-Y, X-Z, Y-Y . . . ) can be mutually orthogonal or take different angle orientations provided they altogether cover the 3-dimensional survey space. Multi-modal measurements are the receiver sensor measurements taken between different multi-component array pairs that can be either centralized or decentralized as well (e.g., Array 0-Array 0 centralized to centralized; Array 0-Array 1 centralized to decentralized; Array 1-Array 3 decentralized to decentralized). This multi-modal multi-component instrumentation architecture provides a thorough electromagnetic scanning survey of the surrounding tubular structures, well construction parts and materials, and earth formation as well.

In the illustrated embodiment, the following instrumentation aspects surrounding these multi-modal multi-components arrays include: i) Arrays 0, 1, 2, 3, 4, and 5 (arrays N and M) are multi-component three-dimensional arrays; ii) Array 0 is a 3D multi-component centralized array; iii) Arrays 1, 2, 3, and 4 are 3D multi-component decentralized arrays. Moreover, in each decentralized array the X component (which may be an arbitrary convention choice including the Y component) of the multicomponent array is oriented radially with different azimuthal orientation angles respectively. Therefore, as an example of such arrangement, the Array 1 is oriented with an angle 1804 ($\phi1$), the Array 2 is oriented with an angle 1806 ($\phi2$), the Array 3 is oriented with an angle 1808 ($\phi3$), and the Array 4 oriented with an angle 1810 ($\phi4$). Each decentralized array covers mostly measurements in separate quadrants.

Table 3 illustrates a sub-matrix of multicomponent measurements obtained by the same or different interacting arrays. Table 3 may be considered to be representative of a 5×5 matrix with 25 squares.

TABLE 3

| 0 | 1-0 | 2-0 | 3-0 | 4-0 |
|---|-----|-----|-----|-----|
| 0-1 | 1-1 | 2-1 | 3-1 | 4-1 |
| 0-2 | 1-2 | 2-2 | 3-2 | 4-2 |
| 0-3 | 1-3 | 2-3 | 3-3 | 4-3 |
| 0-4 | 1-4 | 2-4 | 3-4 | 4-4 |

The squares in the composite matrix main diagonal represent multi-component array measurements made independently by and within each array (zero through five). The other off-diagonal square sub-matrixes indicate multi-component array measurements obtained by different interacting multi-component arrays. Any combination of the arrays (e.g. induction coils) and their segments described herewith (i.e. centralized or decentralized, symmetric or asymmetric, etc. . . . ) may be either driven with separate customized arbitrary time-domain waveforms or processed in multiple combinatorial modes. These arrays can operate simultaneously driven, processed proportionally by a system of equations to yield a variety of excitation modes such as dipole, quadrupole, etc. measurements and signal detection methods therefore selectively enhancing the sensitivity to and focus on defects and targeted features of this multi-barrier survey instrumentation. The excitation and measurement arrays (e.g. induction coils) can be assembled in the inner or outer surfaces of the instrument's pressure wall or embedded within this pressure wall to accomplish instrumentation response enhancements and improved operational mechanical protection.

FIGS. 19A and 19B illustrate representations of instrument architectural strategies to obtain an all-around azimuthal surrounding media's instrumentation survey coverage with a centralized and a decentralized array. Such an architecture is accomplished by either rotating the whole assembly, as shown in FIG. 19A, or maintaining the outer shell fixed with respect to the remaining tool structure and only rotating the inner structure, as shown in FIG. 19B. As will be appreciated, components described with respect to FIGS. 16A and 16B may be utilized in various embodiments of FIGS. 19A and 19B. For example, a motor or a gear may be incorporated in the tool to facilitate rotation. The outer pressure shell can be either conductive (e.g. metallic), non-conductive (minimally conductive), or moderately conductive (corresponding conductivity ranges can be provided for each case). The electromagnetic receiver sensors (e.g. inductive coil, hall-effect sensor) and transmitter sources excitation mounted in the inner or outer wall surface of the instrument's pressure barrier as shown in the lower part of the corresponding figure.

FIG. 19A illustrates a schematic view of the tool body 1900 where a tool body rotation 1902 is illustrated by the arrow. For simplicity, only two arrays 1904 are shown. As will be appreciated, the arrays 1904 may be in a fixed position as a shell 1906 of the tool body rotates. FIG. 19B illustrates a schematic view where the shell 1906 of the body is fixed, as illustrated by the arrow 1902. In contrast, the arrays 1904 may be configured to rotate within the shell 1906, as illustrated by the arrow 1908.

Figure 20A:
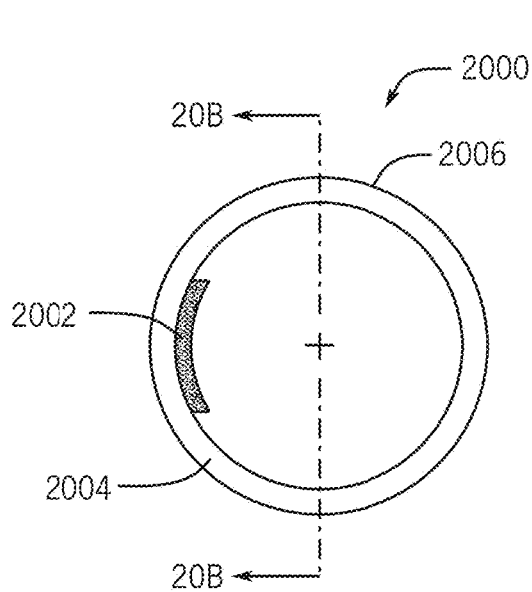
FIG. 20A is a cross-sectional view of an embodiment of a downhole tool, in accordance with embodiments of the present disclosure.
Figure 20B:
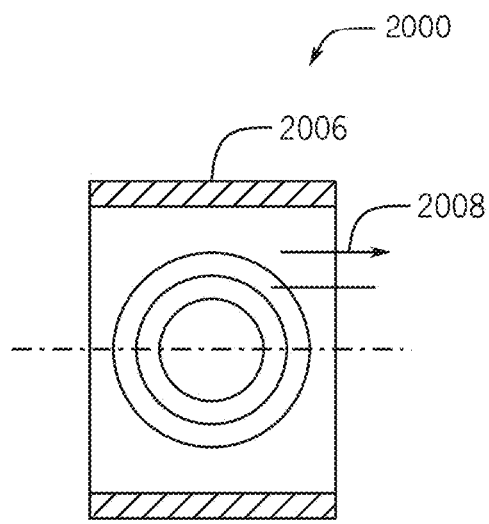
FIG. 20B is a sectional view along line 20B-20B of an embodiment of a downhole tool, in accordance with embodiments of the present disclosure.

FIGS. 20A and 20B illustrate a tool mounting configuration 2000 where an array 2002 is positioned within an inside wall 2004 of a tool body 2006. As shown in the cross-sectional view of FIG. 20A, the tool body 2006 may include one or more mounting brackets or the like to arrange the array 2002 against the inside wall 2004. It should be appreciated that there may be gaps between the array 2002 and the wall 2004, as well as windows or the like. FIG. 20B is a cross-sectional view along the line 20-20 illustrating coils 2008 arranged along the inside wall 2004.

Figure 21A:
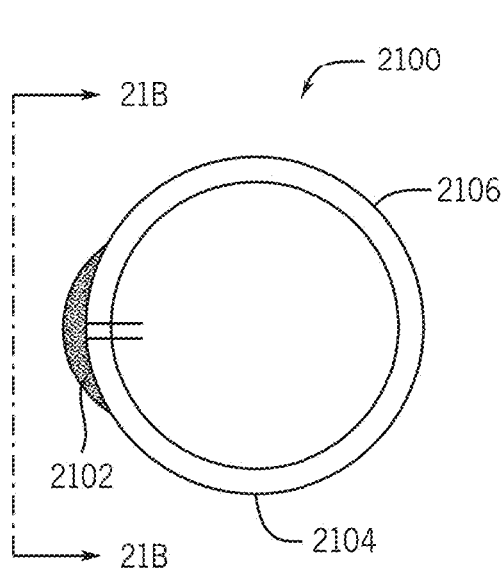
FIG. 21A is a cross-sectional view of an embodiment of a downhole tool, in accordance with embodiments of the present disclosure.
Figure 21B:
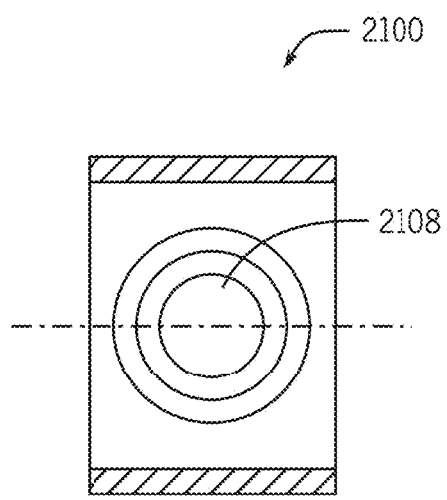
FIG. 21B is a front view of an embodiment of a downhole tool, in accordance with embodiments of the present disclosure.

FIGS. 21A and 21B illustrate a tool mounting configuration 2100 where an array 2102 is positioned at an outside wall 2104 of a tool body 2106. As shown in the cross-sectional of FIG. 21A, the tool body 2106 may include one or more mounting brackets or the like to arrange the array 2102 against the outside wall 2104. It should be appreciated that there may be gaps between the array 2102 and the wall 2104. FIG. 21B is a front view illustrating coils 2108 arranged along the outside wall 2104.

In various embodiments, acoustic and nuclear tool assemblies combined along with the multi-modal surveys described above may provide a multi-physics survey (electromagnetic, nuclear, and acoustic) to accomplish a more capable instrumentation of the surrounding media structure and materials. Nuclear and acoustic downhole instrumentations built with an azimuthal aperture therefore restricting the survey measurements to evaluate a limited azimuthal volumetric sector of the structure and materials in front of the azimuthal aperture window. These nuclear and acoustic azimuthal aperture sensitivity controlled measurements can be combined and rotate in coordination with the electromagnetic measurements which can be synchronized and organized in storage and grouped as transmitted by telemetry to be properly interpreted and assigned to the same volumes surveyed with depth and azimuthal indexing.

In various embodiments, the arrays (such as the decentralized arrays) may be formed within the pressure cavity of the tool, within the wall of the pressure cavity, or outside the pressure cavity of the tool. For example, the array outside of the pressure cavity would have less material to reach the tubulars being interrogated, which may provide improved information. Furthermore, it should be appreciated that, in various embodiments, information may be captured from the frequency domain associated with an alternating current source. This may provide a more efficient tool, as back EMF may be captured by a capacitor for later discharge.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A computer-implemented method, comprising:
   receiving a plurality of sensor signals, each signal of the plurality of sensor signals being tagged with an associated time and depth;
   selecting a baseline signal corresponding to a collar associated with a tubular;

comparing a selected sensor signal, of the plurality of sensor signals, to the baseline signal;

determining a difference between the baseline signal and the selected sensor signal exceeds a threshold, the difference determined, at least in part, on a temporal decay of the selected sensor signal within a time domain; and identifying, based at least in part on the difference, a feature of interest associated with the selected sensor signal.

2. The computer-implemented method of claim 1, further comprising:

selecting a second sensor signal, of the plurality of sensor signals;

comparing the second sensor signal to the baseline signal;

determining a second difference between the baseline signal and the second sensor signal is below a threshold; and identifying additional sensor signals, of the plurality of sensor signals, the additional sensor signals having not been compared to the baseline signal.

3. The computer-implemented method of claim 1, further comprising:

determining a direction associated with the feature of interest, the direction corresponding to an increase or a decrease of at least a portion of the selected signal value at a respective depth; and determining, based at least in part on the direction, whether the feature of interest corresponds to a material loss or a material addition.

4. The computer-implement of claim 1, wherein the baseline signal is at least one of a measured signal, a simulated signal, or a hybrid signal.

5. The computer-implemented method of claim 1, further comprising:

determining a plurality of differences for a plurality of sensor signals compared to the baseline signal;

determining a start time and an end time for the plurality of sensor signals; and determining a severity of the feature of interest, based at least in part on the start time and the end time.

6. The computer-implemented method of claim 1, further comprising:

determining an identifying component, based at least in part on the difference, the identifying component corresponding to a material addition at an outer diameter of a tubular.

7. The computer-implemented method of claim 1, further comprising:

generating, based at least in part on the plurality of sensor signals, a visualization of one or more signatures associated with the plurality of sensor signals, the visualization including, for the one or more signatures, a visible directionality of the one or more signatures at the associated depth.

8. The computer-implemented method of claim 1, further comprising:

providing a graphical representation of a well log in a time domain.

9. A method for identifying a feature of interest, comprising:

receiving a well log for at least a portion of a wellbore;

determining, from the well log, a collar location;

setting a reference value corresponding to the collar location;

comparing a signal, the signal corresponding to a depth and a time, against the reference value;

determining a difference, based at least in part on a temporal decay of the signal within a time domain, between the signal and the reference value exceeds a threshold; and identifying the feature of interest.

10. The method of claim 9, wherein the reference value is a simulated signal.

11. The method of claim 9, further comprising:

receiving a plurality of signals, at the depth, each signal including the feature of interest;

determining a start time, associated with the signal, and an end time, associated with a second signal of the plurality of signals; and determining, based at least in part on the start time and the end time, a radial extent of the feature of interest.

12. The method of claim 9, further comprising:

identifying, based at least in part on the feature of interest, a first wellbore tubular of a plurality of wellbore tubulars.

13. The method of claim 9, wherein the feature of interest corresponds to a material addition or a material loss.

14. The method of claim 9, further comprising:

receiving a second signal, the second signal corresponding to a second depth and a second time;

comparing the second signal against the reference value;

determining a second difference between the second signal and the reference value exceeds the threshold;

identifying a second feature of interest;

comparing the time and the second time;

determining the time is later than the second time; and determining the second feature of interest is radially inward compared to the feature of interest.

15. The method of claim 9, further comprising:

receiving a second signal, the second signal corresponding to a second depth and a second time;

comparing the second signal against the reference value;

determining a second difference between the second signal and the reference value exceeds the threshold;

identifying a second feature of interest;

comparing the time and the second time;

determining the time is earlier than the second time; and determining the second feature of interest is radially outward compared to the feature of interest.

16. The method of claim 9, further comprising:

receiving a second signal, the second signal corresponding to a second depth and a second time;

comparing the second signal against the reference value;

determining a second difference between the second signal and the reference value exceeds the threshold;

identifying a second feature of interest;

comparing the time and the second time;

determining the time is earlier than the second time;

determining the first signal and the second signal correspond to a multi-barrier well;

determining the feature of interest is on a radially inward barrier; and determining the second feature of interest is on a radially outward barrier.

* * * * *